(12) United States Patent
Secareanu

(10) Patent No.: US 12,107,607 B2
(45) Date of Patent: Oct. 1, 2024

(54) BINARY COMPRESSION / DECOMPRESSION METHOD

(71) Applicant: Radu Mircea Secareanu, Phoenix, AZ (US)

(72) Inventor: Radu Mircea Secareanu, Phoenix, AZ (US)

(73) Assignee: Radu Mircea Secareanu

( * ) Notice: Subject to any disclaimer, the term of this patent is extended or adjusted under 35 U.S.C. 154(b) by 170 days.

(21) Appl. No.: 17/667,650

(22) Filed: Feb. 9, 2022

(65) Prior Publication Data

US 2023/0253982 A1    Aug. 10, 2023

(51) Int. Cl.
  *H03M 7/00*    (2006.01)
  *H03M 7/30*    (2006.01)
  *H04L 9/06*    (2006.01)

(52) U.S. Cl.
  CPC ........ *H03M 7/3084* (2013.01); *H04L 9/0631* (2013.01)

(58) Field of Classification Search
  CPC .......................... H03M 7/3084; H03M 7/3093
  USPC .............................................. 341/51, 50, 52
  See application file for complete search history.

(56) References Cited

U.S. PATENT DOCUMENTS

| | | | |
|---|---|---|---|
| 8,190,584 B1* | 5/2012 | Kemeny | H03M 7/3077 707/693 |
| 2007/0085716 A1* | 4/2007 | Bar-Yossef | G06F 16/90344 341/87 |
| 2011/0246544 A1* | 10/2011 | Davis | G06Q 30/0201 707/822 |
| 2023/0101865 A1* | 3/2023 | Bongner | H03M 7/6047 341/51 |

* cited by examiner

*Primary Examiner* — Peguy Jean Pierre

(57) ABSTRACT

A binary data compression/decompression method is disclosed, where any input binary data string (IFDS) is uniquely and reversibly compressed/decompressed without any data loss, by first transforming the IFDS in well defined variable length binary constructs using well defined criteria and procedure, followed by partitioning the IFDS in IFDS slices of optimal sizes based on well defined criteria, where each IFDS slice is individually compressed according to three independent schemes and several extensions that are all based on mathematical description of well defined relationships noted within the content of such an IFDS slice in term of specific binary constructs, leading to unique identifiable binary entities that are used to generate compression gain by reassignment of specific well defined parts of the data constructs within the subject IFDS slice, where such compressed IFDS slices are assembled in the same original slice order as found in the original uncompressed IFDS, creating the full compressed IFDS, where an unlimited but defined number of such compression cycles are executed until the desired final file size is achieved.

25 Claims, 22 Drawing Sheets

100

011_001_110_000_001_011_101_111_011_111

101  102

103

String 100 description using FB and AB:

FB=0

106

AB structure: 1_2_2_3_6_1_1_3_1_4_1_5

104

String 100 after RB transformation:

FB=0

105

RB transformation:

10_101_001_000_001_110_011_000_110_000

AB structure:

FB: 0
PS_1: 1_2_2_3_4_0
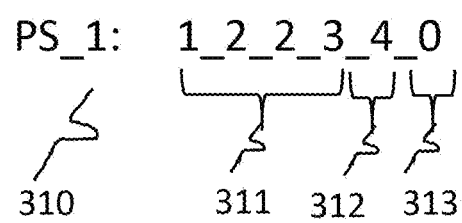
310   311  312  313
PS_2: 2_1_1_3_1_4_1
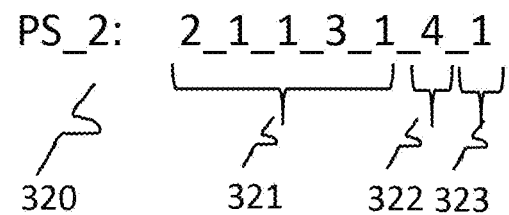
320   321   322 323
PS_3: 1_4_0          PS_4: 1
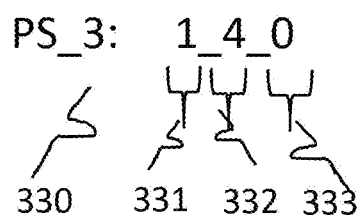   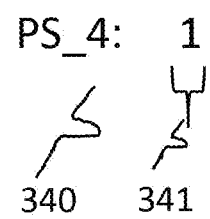
330  331 332 333     340   341
FIG. 3

|   | Actual 402 | Sum4 Description 404 | Actual 405 | Sum5 Description 407 |
|---|---|---|---|---|
| 1 | 1111 | 000 | 11111 | 0000 |
| 2 | 112 | 001 | 1112 | 0001 |
| 3 | 121 | 010 | 1121 | 0010 |
| 4 | 211 | 011 | 1211 | 0011 |
| 5 | 22 | 100 | 2111 | 0100 |
| 6 | 13 | 101 | 122 | 0101 |
| 7 | 31 | 110 | 212 | 0110 |
| 8 | 4 | 111 (408) | 221 | 0111 |
| 9 |  |  | 113 | 1000 |
| 10 |  |  | 131 | 1001 |
| 11 |  |  | 311 | 1010 |
| 12 |  |  | 23 | 1011 |
| 13 |  |  | 32 | 1100 |
| 14 |  |  | 14 | 1101 (409) |
| 15 |  |  | 41 | 1110 (410) |
| 16 |  |  | 5 | 1111 (411) |

*FIG. 4*

|  | Need | Available | Remain | Worth |
|---|---|---|---|---|
| Sum4 | 7 | 8 | 1 |  |
| Sum5 | 13 | 16 | 3 |  |
| Sum6 | 24 | 32 | 8 |  |
| Sum7 | 44 | 64 | 20 |  |
| Sum8 | 81 | 128 | 47 |  |
| Sum9 | 149 | 256 | 107 |  |
| Sum10 | 274 | 512 | 238 |  |
| Sum11 | 504 | 1024 | 520 |  |
| Sum12 | 927 | 2048 | 1121 |  |
| Sum13 | 1705 | 4096 | 2391 |  |
| Sum14 | 3136 | 8192 | 5056 |  |

501, 502, 503, 504, 505

|  No | Class |
| --- | --- |
| 11 | 9_4 |
| 12 | 10_4 |
| 13 | 11_4 |
| 14 | 12_4 |
| 15 | 13_4 |
| 16 | 14_4 |
| 16+k | (14+k)_4 |
| (16+m)+1 | (14+m+1)_3 |
| (16+m)+2 | (14+m+2)_2 |
| (16+m)+3 | (14+m)_3_1 |
| (16+m)+4 | (14+m+1)_2_1 |
| (16+m)+5 | (14+m+2)_1_1 |
| (16+m)+6 | (14+m)_3_2 |
| (16+m)+7 | (14+m+1)_2_2 |
| (16+m)+8 | (14+m+2)_1_2 |
| (16+m)+9 | (14+m)_3_3 |
| (16+m)+10 | (14+m+1)_2_3 |
| (16+m)+11 | (14+m+2)_1_3 |
| (16+m)+12 | (14+m+3)_4 |

FIG. 10

|   | 1101 1102 | 1103 Class 8 RI pair | 1104 |   | 1105 1106 | 1107 Class 9 RI pair | 1108 |
|---|---|---|---|---|---|---|---|
|   |   | Header | Description |   |   | Header | Description |
| 1 |   | 000 | 00000 | 26 |   | 000 | 110010 |
| 2 |   | 000 | 00001 | 27 |   | 000 | 110011 |
| 3 |   | 000 | 00010 | 28 |   | 000 | 110100 |
| 4 |   | 000 | 00011 | 29 |   | 000 | 110101 |
| 5 |   | 000 | 00100 | 30 |   | 000 | 110110 |
| 6 |   | 000 | 00101 | 31 |   | 000 | 110111 |
| 7 |   | 000 | 00110 | 32 |   | 000 | 111000 |
| 8 |   | 000 | 00111 | 33 |   | 000 | 111001 |
| 9 |   | 000 | 01000 | 34 |   | 000 | 111010 |
| 10 |   | 000 | 01001 | 35 |   | 000 | 111011 |
| 11 |   | 000 | 01010 | 36 |   | 000 | 111100 |
| 12 |   | 000 | 01011 | 37 |   | 000 | 111101 |
| 13 |   | 000 | 01100 | 38 |   | 000 | 111110 |
| 14 |   | 000 | 01101 | 39 |   | 000 | 111111 |
| 15 |   | 000 | 01110 | 40 |   | 001 | 000000 |
| 16 |   | 000 | 01111 | 41 |   | 001 | 000001 |
| 17 |   | 000 | 10000 |   |   |   |   |
| 18 |   | 000 | 10001 |   |   |   |   |
| 19 |   | 000 | 10010 |   |   |   |   |
| 20 |   | 000 | 10011 |   |   |   |   |
| 21 |   | 000 | 10100 |   |   |   |   |
| 22 |   | 000 | 10101 |   |   |   |   |
| 23 |   | 000 | 10110 |   |   |   |   |
| 24 |   | 000 | 10111 |   |   |   |   |
| 25 |   | 000 | 11000 |   |   |   |   |

*FIG. 11*

| Class (1201) | Prob (1202) | unit (1203) |
|---|---|---|
| 4 | 6.25 | 6.25 |
| 1_4 | 6.25 | 6.25 |
| 2_4 | 6.25 | 3.1250 |
| 3_4 | 6.25 | 1.5625 |
| 4_4 | 5.47 | 0.78125 |
| 5_4 | 5.08 | 0.390625 |
| 6_4 | 4.69 | 0.1953125 |
| 7_4 | 4.30 | 0.09765625 |
| 8_4 | 3.96 | 0.048828125 |
| 9_4 | 3.64 | 0.024414063 |
| 10_4 | 3.34 | 0.012207031 |
| 11_4 | 3.08 | 0.006103516 |
| 12_4 | 2.83 | 0.003051758 |
| 13_4 | 2.60 | 0.001525879 |
| 14_4 | 2.39 | 0.000762939 |
| 15_4 | 2.20 | 0.00038147 |
| 16_3 | 4.05 | 0.00038147 |
| 17_2 | 7.44 | 0.00038147 |

| 1201 | 1202 | 1203 |
|---|---|---|
| 15_3_1 | 1.10 | 0.000190735 |
| 16_2_1 | 2.02 | 0.000190735 |
| 17_1_1 | 3.72 | 0.000190735 |
| 15_3_2 | 0.55 | 0.000095367 |
| 16_2_2 | 1.01 | 0.000095367 |
| 17_1_2 | 1.86 | 0.000095367 |
| 15_3_3 | 0.28 | 0.000047684 |
| 16_2_3 | 0.51 | 0.000047684 |
| 17_1_3 | 0.93 | 0.000047684 |
| 18_4 | 1.71 | 0.000047684 |
| 5 | 3.13 | 3.125000000 |
| 6 | 1.56 | 1.562500000 |
| 7 | 0.78 | 0.781250000 |
| 8 | 0.39 | 0.390625000 |
| 9 | 0.20 | 0.195312500 |
| 10 | 0.10 | 0.097656250 |
| 11 | 0.05 | 0.048828125 |
| 12 | 0.02 | 0.024414063 |
| >13 | 0.02 | |

1305 (bracket grouping rows 5 through >13)

| | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|
| 1_4 | 1 | | | | | | | | | | | | | | | | | |
| 2_4 | 1 | | | | | | | | | | | | | | | | | |
| 3_4 | 1 | | | | | | | | | | | | | | | | | |
| 4_4 | | 1 | 1 | 1 | | | | | | | | | | | | | | |
| 5_4 | | 1 | 1 | 1 | 1 | | | | | | | | | | | | | |
| 6_4 | | 1 | 1 | | 1 | | | | | | | | | | | | | |
| 7_4 | | 1 | 1 | 1 | | | | | | | | | | | | | | |
| 8_4 | | 1 | | 1 | 1 | | | | | | | | | | | | | |
| 9_4 | | 1 | | | | 1 | 1 | 1 | | | | | | | | | | |
| 10_4 | | | | | 1 | 1 | 1 | | 1 | | | | | | | | | |
| 11_4 | | | 1 | 1 | 1 | 1 | 1 | 1 | | | | | | | | | | |
| 12_4 | | | 1 | 1 | 1 | 1 | 1 | 1 | 1 | 1 | 1 | | | | | | | |
| 13_4 | | | 1 | 1 | | 1 | | 1 | | 1 | 1 | 1 | | | | | | |
| 14_4 | | | 1 | 1 | | | | 1 | | | | | | | | | | |
| 15_4 | | 1 | 1 | | 1 | 1 | | 1 | | | | 1 | 1 | | | | | |

| 1401 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|
| 16_3 | 1 | 1 |  | 1 |  |  |  |  |  | 1 | 1 |  |  |  | 1 |  |  |  |
| 17_2 |  |  | 1 | 1 | 1 |  |  |  |  | 1 | 1 |  |  | 1 |  |  |  |  |
| 18_4 |  |  |  |  |  | 1 | 1 |  |  |  |  | 1 | 1 |  | 1 | 1 |  |  |
| 15_3_1 |  | 1 |  |  | 1 |  | 1 |  | 1 |  |  |  |  |  |  |  |  |  |
| 16_2_1 |  |  |  | 1 | 1 | 1 |  |  |  | 1 |  |  | 1 | 1 |  |  |  |  |
| 17_1_1 |  |  | 1 |  | 1 | 1 |  |  |  |  | 1 | 1 |  |  |  | 1 | 1 |  |
| 15_3_2 |  |  |  |  |  | 1 | 1 |  |  |  | 1 | 1 |  |  |  |  |  |  |
| 16_2_2 |  |  |  |  |  |  |  | 1 | 1 |  |  |  | 1 | 1 |  |  |  |  |
| 17_1_2 |  |  |  |  |  |  |  | 1 | 1 |  |  |  |  |  | 1 |  |  |  |
| 15_3_3 |  |  |  |  |  |  | 1 |  |  |  |  | 1 |  |  |  |  |  |  |
| 16_2_3 |  |  |  |  | 1 |  |  |  |  | 1 |  |  |  | 1 |  | 1 | 1 | 1 |
| 17_1_3 |  |  |  | 1 |  |  |  |  |  |  | 1 |  |  | 1 | 1 | 1 | 1 | 1 |
| Total | 4 | 9 | 11 | 12 | 11 | 9 | 9 | 11 | 7 | 7 | 7 | 8 | 8 | 5 | 4 | 2 | 3 | 2 |
|       | 1 | 1 | 1  | 1  | 1  | 1 | 1 | 1  | 1 | 1 | 1 | 1 | 1 | 1 | 1 | 1 | 1 | 1 |
|       | 5 | 10| 12 | 13 | 12 | 10| 10| 12 | 8 | 8 | 8 | 9 | 9 | 6 | 5 | 3 | 4 | 4 |

| c5_2 | | c5_3 | | link |
|---|---|---|---|---|
| a1 | 1_2 | b1 | 1_2_3 | a1 -> b1 |
| a2 | 1_3 | b2 | 1_2_4 | a2 -> b4 |
| a3 | 1_4 | b3 | 1_2_5 | a3 -> b2 |
| a4 | 1_5 | b4 | 1_3_4 | a4 -> b3 |
| a5 | 2_3 | b5 | 1_3_5 | a5 -> b7 |
| a6 | 2_4 | b6 | 1_4_5 | a6 -> b9 |
| a7 | 2_5 | b7 | 2_3_4 | a7 -> b8 |
| a8 | 3_4 | b8 | 2_3_5 | a8 -> b0 |
| a9 | 3_5 | b9 | 2_4_5 | a9 -> b5 |
| a0 | 4_5 | b0 | 3_4_5 | a0 -> b6 |

1701, 1702, 1703, 1704, 1705, 1706, 1707, 1708

| RI pair class 1801 | No. of members 1802 | Probability 1803 | No. of occurrences in 100 pairs 1804 |
|---|---|---|---|
| 8 | 25 | 0.390625 | 9.765625 |
| 9 | 100 | 0.1953125 | 19.53125 |
| 10 | 220 | 0.09765625 | 21.484375 |
| 11 | 370 | 0.04882813 | 18.0664063 |
| 12 | 524 | 0.02441406 | 12.7929688 |
| 13 | 652 | 0.01220703 | 7.95898438 |
| 14 | 757 | 0.00610352 | 4.62036133 |
| 15 | 872 | 0.00305176 | 2.66113281 |
| 16 | 964 | 0.00152588 | 1.47094727 |
| 17 | 1028 | 0.00076294 | 0.78430176 |
| 18 | 1084 | 0.00038147 | 0.41351318 |
| 19 | 1138 | 0.00019073 | 0.21705627 |
| 20 | 1202 | 9.5367E-05 | 0.11463165 |
| 21 | 1256 | 4.7684E-05 | 0.05989075 |
| 22 | 1276 | 2.3842E-05 | 0.03042221 |
| 23 | 1236 | 1.1921E-05 | 0.01473427 |
| 24 | 1188 | 5.9605E-06 | 0.00708103 |
| 25 | 1146 | 2.9802E-06 | 0.00341535 |

*FIG. 18*

| RI pair class | No. of members | Probability | No. of occurrences in 100 pairs |
|---|---|---|---|
| 26 | 1082 | 1.4901E-06 | 0.00161231 |
| 27 | 980 | 7.4506E-07 | 0.00073016 |
| 28 | 856 | 3.7253E-07 | 0.00031888 |
| 29 | 740 | 1.8626E-07 | 0.00013784 |
| 30 | 633 | 9.3132E-08 | 5.8953E-05 |
| 31 | 562 | 4.6566E-08 | 2.617E-05 |
| 32 | 477 | 2.3283E-08 | 1.1106E-05 |
| 33 | 374 | 1.1642E-08 | 4.3539E-06 |
| 34 | 308 | 5.8208E-09 | 1.7928E-06 |
| 35 | 250 | 2.9104E-09 | 7.276E-07 |
| 36 | 205 | 1.4552E-09 | 2.9831E-07 |
| 37 | 150 | 7.276E-10 | 1.0914E-07 |
| 38 | 97 | 3.638E-10 | 3.5288E-08 |
| 39 | 64 | 1.819E-10 | 1.1642E-08 |
| 40 | 40 | 9.0949E-11 | 3.638E-09 |
| 41 | 32 | 4.5475E-11 | 1.4552E-09 |
| 42 | 16 | 2.2737E-11 | 3.638E-10 |

Columns: 1801 (RI pair class), 1802 (No. of members), 1803 (Probability), 1804 (No. of occurrences in 100 pairs)

FIG. 19

| RI2 class | Members | Probability | In 100 |
|---|---|---|---|
| 3 | 4 | 12.5 | 50 |
| 4 | 4 | 6.25 | 25 |
| 5 | 3 | 3.125 | 9.375 |
| 6 | 4 | 1.5625 | 6.25 |
| 7 | 6 | 0.78125 | 4.6875 |
| 8 | 5 | 0.390625 | 1.953125 |
| 9 | 5 | 0.195313 | 0.976563 |
| 10 | 7 | 0.097656 | 0.683594 |
| 11 | 2 | 0.048828 | 0.097656 |
| 12 | 3 | 0.024414 | 0.073242 |
| 13 | 4 | 0.012207 | 0.048828 |
| 14 | 6 | 0.006104 | 0.036621 |
| 15 | 7 | 0.003052 | 0.021362 |
| 16 | 6 | 0.001526 | 0.009155 |
| 17 | 3 | 0.000763 | 0.002289 |
| 18 | 4 | 0.000381 | 0.001526 |
| 19 | 7 | 0.000191 | 0.001335 |
| 20 | 5 | 9.54E-05 | 0.000477 |

Columns labeled 2001, 2002, 2003, 2004.

*FIG. 20*

|       | 2001 | 2002 | 2003 | 2004 |
|-------|------|------|------|------|
| RI2 class | Members | Probability | In 100 |
| 21 | 4 | 4.77E-05 | 0.000191 |
| 22 | 6 | 2.38E-05 | 0.000143 |
| 23 | 2 | 1.19E-05 | 2.38E-05 |
| 24 | 5 | 5.96E-06 | 2.98E-05 |
| 25 | 6 | 2.98E-06 | 1.79E-05 |
| 26 | 4 | 1.49E-06 | 5.96E-06 |
| 27 | 4 | 7.45E-07 | 2.98E-06 |
| 28 | 2 | 3.73E-07 | 7.45E-07 |
| 29 | 5 | 1.86E-07 | 9.31E-07 |
| 30 | 7 | 9.31E-08 | 6.52E-07 |
| 31 | 2 | 4.66E-08 | 9.31E-08 |
| 32 | 5 | 2.33E-08 | 1.16E-07 |
| 33 | 4 | 1.16E-08 | 4.66E-08 |
| 34 | 2 | 5.82E-09 | 1.16E-08 |
| 35 | 2 | 2.91E-09 | 5.82E-09 |
| 36 | 3 | 1.46E-09 | 4.37E-09 |
| 37 | 1 | 7.28E-10 | 7.28E-10 |
| 38 | 2 | 3.64E-10 | 7.28E-10 |
|    | 151 |       |       |

*FIG. 21*

BINARY COMPRESSION / DECOMPRESSION METHOD

FIELD

The present disclosure relates to binary compression/decompression methods, and in particular to binary compression/decompression methods that are suitable to be implemented in silicon, as a circuit, in addition (or not only) to be implementable in software.

BACKGROUND

Certain aspects disclosed in the utility patent applications (UPA) mentioned below are being used in the present disclosure. These UPA are filed by the same unique inventor as the present disclosure. These UPA are mentioned here as background for this disclosure. The present disclosure represents new matter. These background utility patent applications (UPA) are:
 EFS ID: 43475104
 Application Number: 17398728
 Applicant Name: Radu Mircea Secareanu
 Filing date: 10 Aug. 2021
 EFS ID: 44721515
 Application Number: 17573438
 Applicant Name: Radu Mircea Secareanu
 Filing date: 11 Jan. 2022

SUMMARY

At the onset, a note regarding the structure of this disclosure is required, note that will enable better understanding of the flow of the disclosure. Key concepts are defined, detailed, and exemplified, concepts that the disclosed embodiments from the present disclosure are based on. The binary compression/decompression method, or the BCD method, is progressively introduced during this process. The BCD method consists in three compression schemes: the Mathematical Processing String scheme, or the MPS scheme, the Mathematical Root Identifier pairings scheme, or the MRI scheme, or the MPS scheme for Root Identifiers of Root Identifier pair, or the MPS scheme for RI2. These three schemes, the MPS, the MRI, or the MPS for RI2 schemes, are progressively disclosed, and in the process, exemplified. Additional capabilities that enhance certain performances of the three schemes, where these additional capabilities include capabilities called extensions among others, are disclosed.

In summary, the BCD method works as follows: an Initial Full Data String (IFDS) is serially partitioned into a number of sequential Processing Strings (PS), where the length of each PS is determined by two conditions: 1) the occurrence of a fixed bit pattern, called Delimiter (DE) or 2) by the reach of a set maximum limit number of bits and/or a group of bits of well defined content with a number of bits less than the said maximum limit number of bits. Every such determined PS is classified and becomes part of an IFDS partition or IFDS slice. The size of such an IFDS partition is determined based on well defined criteria. The original IFDS may have multiple such consecutive IFDS partitions or slices. Every such slice is independently compressed based on well defined criteria. There are three groups of such well defined criteria, with the first group forming the MPS scheme, the second group forming the MRI scheme, and the third group forming the MPS for RI2 scheme. The preferred embodiment is that an IFDS slice is compressed by the MPS scheme, then by the MRI scheme, and then by the MPS for RI2 scheme, but a slice may be compressed in accordance to seven possible typical combinations of the three schemes, where the seven combinations describe a well-defined sequence of the three schemes, as disclosed. During the compression of such an IFDS slice by the MPS scheme or by the MPS for RI2 scheme, one, or a combination of several disclosed extensions are preferably engaged. These extensions may be engaged by the compression during the MRI scheme as well, but the benefits of engaging the extensions by the MRI scheme are notably smaller than when engaged by the other two schemes. Every such compressed IFDS slice is assembled in the same original slice order as found in the original uncompressed IFDS, creating the full compressed IFDS. Once the end of the IFDS is reached, it is called that the end of one compression cycle is reached. Yet another compression cycle can be applied to the data by repeating the process, using as new IFDS the output of the just completed compression cycle. These repeated compression cycles are possible since the said output has a very different structure as compared to the initial input IFDS. Theoretically, an unlimited number of compression cycles can be employed.

The decompression is perfectly mirrored to the compression process, leading to an identical, lossless restored file to the initial IFDS, which was the input to the first cycle.

The preferred implementation of the BCD method is a hardware implementation. A software implementation will replicate identically all the functionality of the BCD method, therefore the hardware and the software implementations are perfectly equivalent from the functionality point of view. A hardware implementation is more expensive than a software implementation, but it is faster in term of compression/decompression speed. Therefore, there is a trade-off between cost and speed between a hardware and software implementation. Because a hardware implementation is faster than a software implementation, certain applications are preferable to be implemented, and possibly only enabled, in a hardware implementation. On the other hand, because a software implementation has a much lower cost than a hardware implementation, certain applications are preferable implemented in a software implementation enabling a low cost for the user.

Concerning the hardware implementation aspects, as will be apparent from the details presented in this disclosure to a person familiar with digital design, the preferred hardware implementation of the BCD method is, due to the serial nature of the BCD method, a fully-pipelined based architecture. Such an architecture will provide the highest compression/decompression speed possible in a hardware implementation.

In conclusion of this summary chapter, the embodiments that are disclosed here permit the following highlights to be stated:

i. The BCD method offers a compression using three schemes and several extensions.
 ii. The BCD method can compress an input string in multiple cycles, where the output of one (current) cycle becomes the input of the next cycle.
 iii. The compression speed is essentially the same as the decompression speed, where said speed is typically larger in a hardware implementation as compared to a software implementation.

BRIEF DESCRIPTION OF DRAWINGS

Embodiments will be described, by way of example, with reference to the drawings, in which FIG. 1 is used to summarise several key concepts for this disclosure, such as first bit (FB), alternate bits (AB), relative bits (RB), and RB transformation, concepts used in one or more of the embodiments.

FIG. 2 and FIG. 3 is used to summarise additional key concepts for this disclosure, such as delimiter (DE), link bit (LB), processing string (PS), PS core, and PS characteristic number (or Sum), concepts used in one or more of the embodiments.

FIG. 4, FIG. 5, FIG. 6, and FIG. 7 are used to summarise the procedure to create the unique correspondence and assignment between an input PS and the corresponding output description, unique correspondence and assignment used in one or more of the embodiments.

FIG. 9 and FIG. 10 are used to introduce how to uniquely describe any input binary string in term of processing strings and constructs specific to this disclosure, description that is used in one or more of the embodiments.

FIG. 11 is used to introduce an equivalent description of an RI pair in terms of two constituent fields, namely header and description fields, equivalent description that is used in one or more of the embodiments.

FIG. 12 and FIG. 13 are used to introduce and describe the probabilities of every PS class and constituent member in the conditions of nominal distribution and probabilities, where these probabilities are used in one or more of the embodiments.

FIG. 14 and FIG. 15 are used to introduce and describe the distribution of every RI class and RI member within each RI class for every PS class, distribution that is used in one or more of the embodiments.

FIG. 16 and FIG. 17 are used to exemplify the procedure to create a unique link between two or more members of a class or of a pre-defined group, where the unique link is based on a mathematical relationship, unique link that is used in one or more of the embodiments.

FIG. 18 and FIG. 19 are used to introduce and describe the RI classes in term of number of members within each class, in term of probabilities of each class and of each member within each class, and in term of content of class and of members in a predefined data string, all used in one or more of the embodiments.

FIG. 20 and FIG. 21 are used to introduce and describe the RI2 classes in term of number of members within each class, in term of probabilities of each class and of each member within each class, and in term of content of class and of members in a predefined data string, all used in one or more of the embodiments.

DETAILED DESCRIPTION OF THE INVENTION

At the outset it should be noted that the examples presented in the disclosure are in no way limiting, and the skilled person will appreciate that the disclosure is equally applicable to multiple variations and alternatives, and multiple optimizations are possible to increase the performance, such as the compression efficiency and speed.

Several concepts relevant for this disclosure are discussed in detail next, including by using examples.

1. First bit (FB), alternate bits (AB), and relative bits (RB)
2. Delimiter (DE) and link bit (LB)
3. Bit sum (Sum) and processing string classification (PS class)
4. Processing string format (PS format) as full PS, exception PS, and termination PS
5. PS input core acceptable configurations (ICAC), PS output description configurations (ODC), and PS remain output description configurations (RODC).
6. Root identifiers (RI) and absolute identifiers (AI)

FIG. 1 is used to summarise the FB, AB, and RB concepts.

In any binary string, there are groups of same type bits, with the bits in any two such consecutive groups alternating. String 100 is an example string, considered here to exemplify the concepts. In string 100, 101 is the first bit (FB) in this string, with a value of 0. 102 is pointing to an underscore, used to improve string readability in this discussion.

String 100, rewritten in term of AB, is shown at 106. The numbers represent the number of bits in alternating groups of same type bits. 103 represents string 100, rewritten in term of FB and AB.

The relative bit is defined as the change in the upcoming bit relative to the current bit. If the upcoming bit changes value (0 to 1 or 1 to 0), the relative bit has a value of 1. If the upcoming bit has a constant value (0 to 0 or 1 to 1) the relative bit has a value of 0.

The RB transformation of string 100 is shown at 105, while the string 100 rewritten to incorporate RB transformation, in term of AB and FB is shown at 104 (107).

Figure 2:
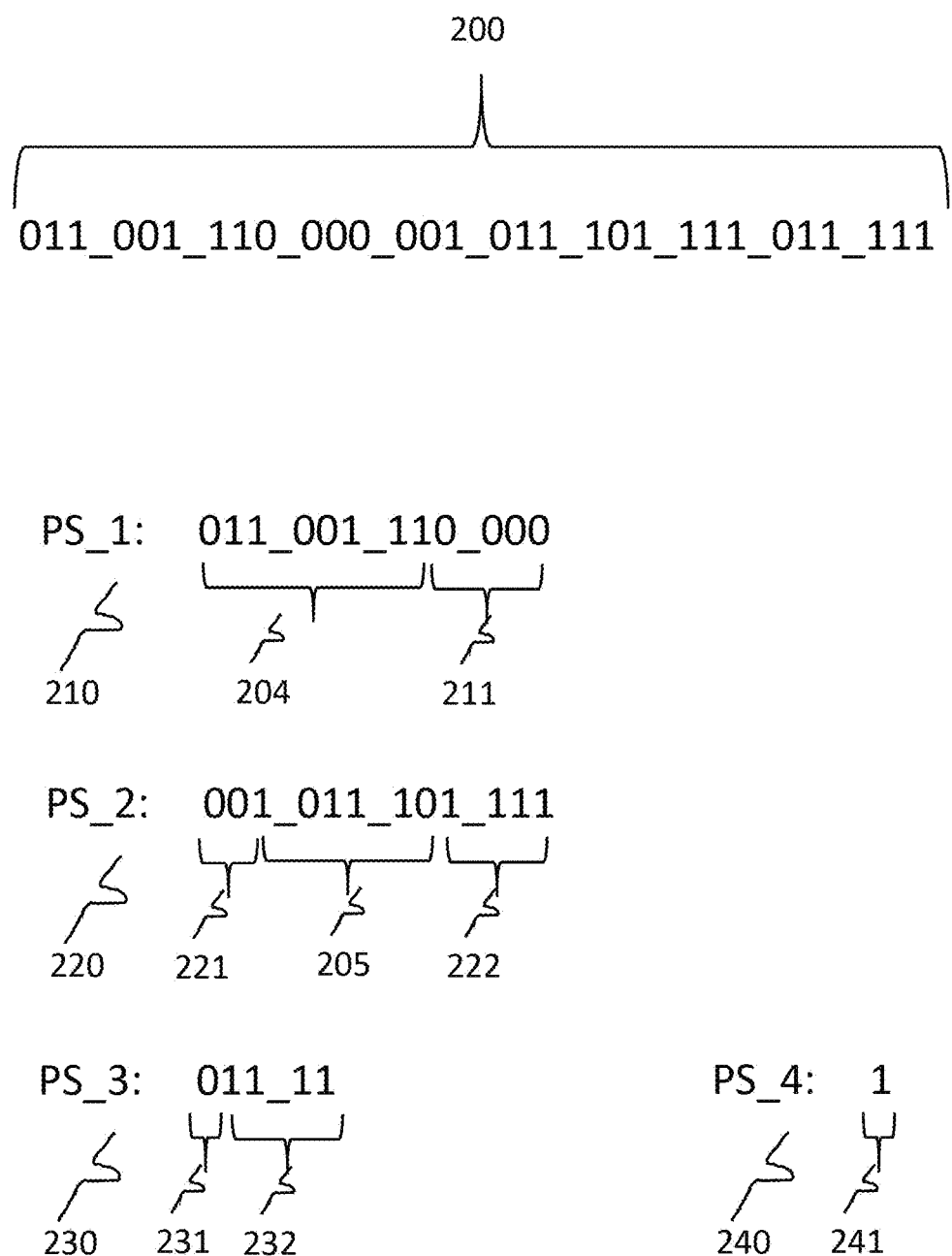

FIG. 2 and FIG. 3 is used to summarise the DE, LB, PS, PS core, and PS characteristic number (or Sum) concepts A delimiter (DE) is defined as a group of bits of a chosen pattern. A group of four same type bits is used in this disclosure as DE.

DE is used to define a PS—a PS is defined as any collection of groups of same type bits in-between two consecutive DE, where said collection ends with a DE, and where, for the DE defined as a group of four same type bits, any such group in-between two consecutive DE has less than four same type bits.

Given the above definitions, string 200 in FIG. 2 has two PS (PS_2 and PS_3, shown as 220 and 230). PS_1 (210) is the first PS in the string, and PS_4 (240) is the last PS in the string.

The link bit (LB) is introduced because after a DE, same type or opposite type bits can follow. For example, 221 has the same type bit as the 211 DE, while 231 has the opposite type bit as the 222 DE. LB has a value of 0 if same type bits follow, and has a value of 1 if opposite type bits follow.

In FIG. 2, 204 for PS_1, 221 plus 205 for PS_2, and 231 for PS_3 are called PS core. 241 for PS_4 (termination PS) is called PS content.

In FIG. 2, the IFDS (200) and every PS have been described in term of absolute bits for clarity. However, in this disclosure, the equivalent FB/AB representation (detailed in FIG. 3) is required (where AB can be a representation of IFDS RB transformation).

In FIG. 3, the FB/AB for PS_1, PS_2, PS_3, and PS_4 are shown as respectively 310, 320, 330, and 340. For PS_1, PS_2, and PS_3, 311, 321, and 331 respectively represent the PS content, 312, 322, and 332 represent the PS DE, 313, 323, and 333 represent the PS LB. For PS_4 termination PS, 341 is the content.

With reference to FIG. 3, adding all the bits in a PS core, a PS characteristic number, or Sum, is obtained. For PS_1, 311 gives a Sum of 8, for PS_2, 321 gives a Sum of 8, for PS_3, 331 gives a Sum of 1. Sum cannot be defined for a termination PS.

The three PS are classified as Sum_DE, namely PS_1 as 8_4, PS_2 as 8_4, PS_3 as 1_4.

As mentioned, LB is introduced to handle the bits coming after a DE. When DE consists of four same type bits (as considered in this disclosure):
- If the bits coming after a DE are less than four same type bits, then these bits become part of the next PS (as exemplified by PS_2 and PS_3 above).
- If the bits coming after a DE are four or greater same type bits, these bits become what is called an exception PS. The characteristic of an exception PS is that it has a core of zero bits, the content is made of all bits of same type following a DE until that bit type changes value, and since the content indicates when the bit changes value, an exception PS does not need a link bit.
- An exception PS always comes after a DE, with the only exception being that it can be the first PS in an IFDS.

There are four types of supported PS therefore:
- Full PS, always in-between two consecutive DE or as the first PS in an IFDS, having a core, a DE, and a link bit, defined as class Sum_DE (for example, 1_4)
- Exception PS, always follows a DE or is the first PS in an IFDS, having a content only, where the content is always greater or equal to four same type bits
- Termination PS, always the last PS in an IFDS.
- Open-string PS, always following a full PS, an exception PS, or another open string PS, having core only and characterized by the fact that the core reaches a set number of bits without a DE occurring.

All the concepts above describe how to identify, classify, and format a PS in an input IFDS. The next concepts refer to how to uniquely format the output in accordance to each and every input PS. To exemplify this unique correspondence that is being created between input PS and output, initial focus is on full PS.

As mentioned, a full PS consists of core, DE, and LB. Each of these three components will be discussed, outlining the unique input-output correspondence and transformation.

The four bit DE at the input becomes a four bit identifier at the output, uniquely identifying the input PS classes.

Figures 5, 6:
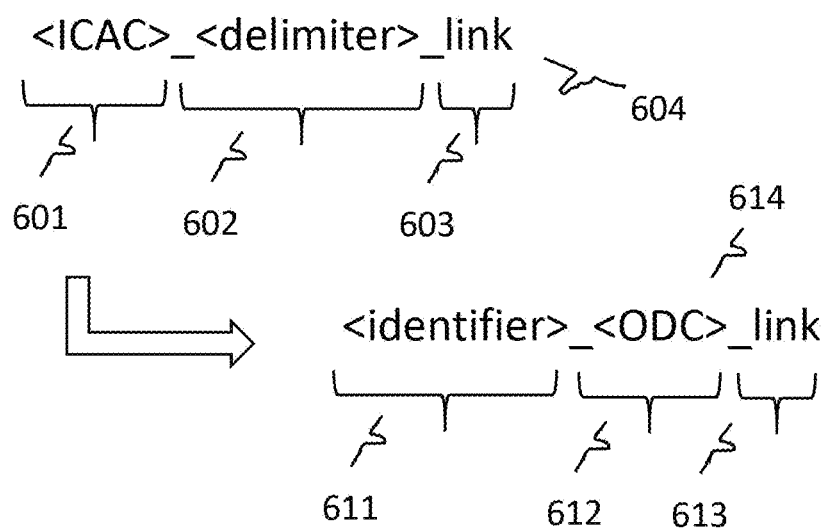

The core:
- When written in FB/AB format, two configurations are enabled to have the same description, and this constitutes one of the main advantage of using the FB/AB format. For example, in class 4_4, configurations 0110 and 1001 (absolute bits) have the same AB format description, namely 121 (one bit-two bits-one bit).
- Core configurations containing groups of 1, 2, and 3 same type bits are called acceptable configurations. There are also non-acceptable configurations. To understand the concept of acceptable and non-acceptable configurations, the delimiter rule (i.e., the rule that says that in-between two delimiters only groups of 1, 2, and 3 same type bits can exist) will be ignored in the discussion to follow. The position of two initial delimiters is maintained. By ignoring the delimiter rule but keeping the location of the initial delimiters, groups of four or more same type bits in-between two delimiters can exist. For example:
  - A PS class with Sum smaller than 4 (classes 1_4, 2_4, and 3_4), has only acceptable configurations.
  - A PS class with Sum greater or equal to 4 has both acceptable and non-acceptable configurations. These are exemplified in FIG. 4, for the first two classes with Sum greater or equal to 4 (class 4_4, and class 5_4, for which Sum=4 (shown as 403) and Sum=5 (shown as 406)). Looking at the 401 index, for class 4_4, the first seven configurations of the core are acceptable, while the 8$^{th}$ configuration (408) is not acceptable. Similarly, for class 5_4, the first 13 configurations are acceptable, while the last three (409, 410, and 411) are not acceptable.
- Both the acceptable and non-acceptable configurations receive a unique description 404/407 that correspond to every actual existing input core configuration 402/405.
- The acceptable configurations are called ICAC (input core acceptable configurations). The unique description corresponding to every ICAC is called ODC (output description configuration), while the description corresponding to every non-ICAC configuration is called RODC (remain output description configuration).
- RODC increases as the class order (or SUM) increases. This is shown in FIG. 5.
  - As mentioned, class 1_4, 2_4, and 3_4 (Sum=1, Sum=2 and Sum=3) have only ICAC, therefore do not have RODC.
  - Classes 4_4 to 14_4 (Sum=4 to Sum=14, listed in column 501), all have RODC. The number of RODC for every class is listed in column 504. As shown, this number increases as the class order increases. Column 502 represents the ICAC for a respective class, while column 503 represents the total supported configurations in that class (ODC+RODC). The worth factor (column 505) will be discussed later.

The LB
- Note that LB for a PS in an input IFDS is an abstract concept, i.e. it is a bit that does not exist in reality. This bit is defined and introduced because, the same LB, with the same value, is required in the unique corresponding output.

In FIG. 6, the input (604) to output (614) transformation for a full PS is shown. 601, 602, and 603 are the three input components (core or ICAC, DE, LB), and 611, 612, and 613 are the three output components (identifier, ODC corresponding to ICAC, and LB).

Figure 7:
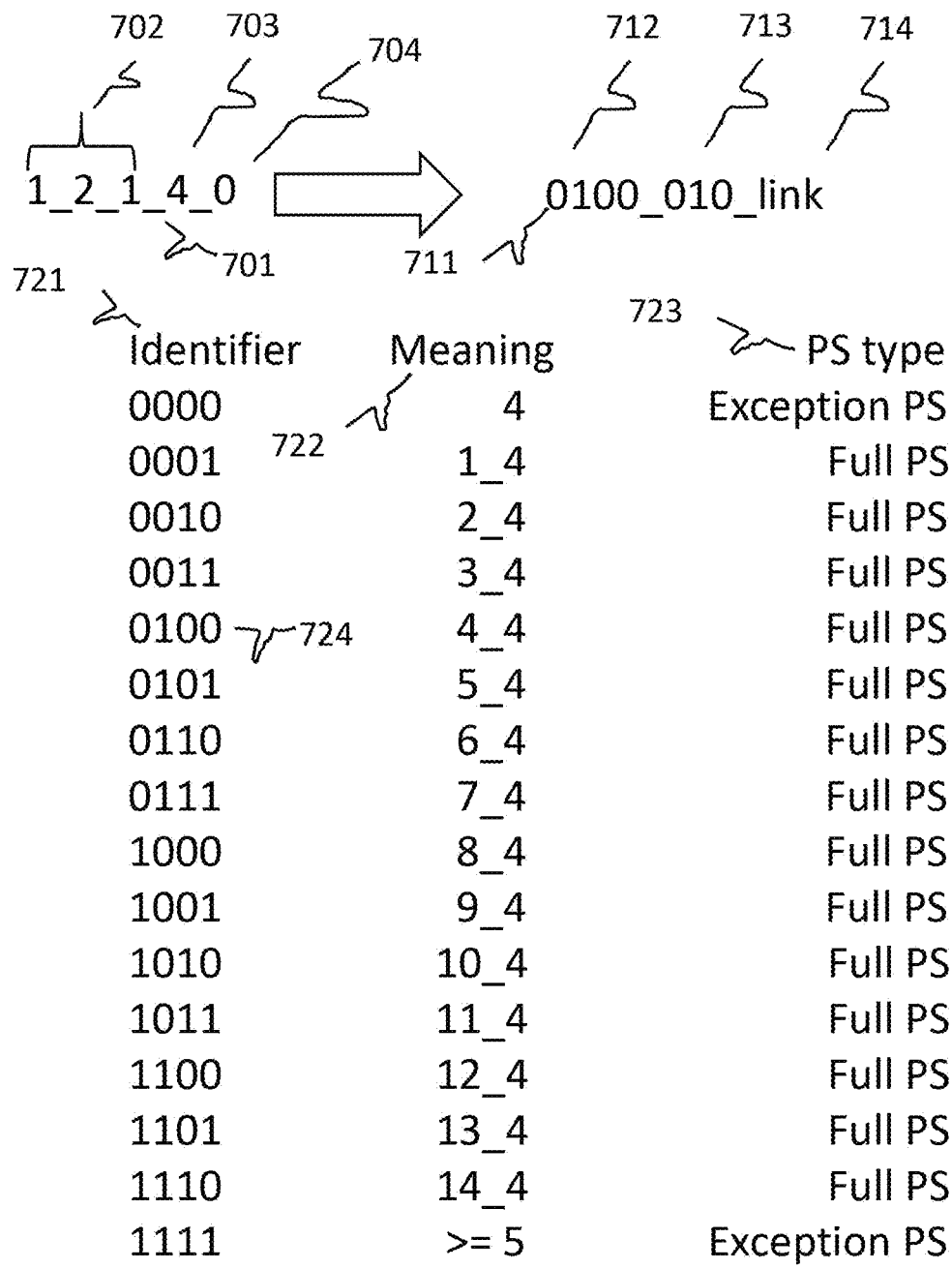

An actual example of such input-output transformation, together with a full list of identifiers and their meaning, are shown in FIG. 7. The input PS is 701, consisting in core (702), DE (703) and LB (704). To this specific input PS, the corresponding output is 711, with 712 being the identifier, 713 being the ODC, and 714 being LB. Note that 713 (010) corresponds to the 121 core, as shown in FIG. 4 at class 4_4, while the identifier for class 4_4 (column 722) is 0100, shown by 724, corresponding to a full PS as indicated in column 723. The list of all identifiers, for all classes, is detailed in column 721.

The identifiers listed in column 721 are called core identifiers. Note that they are used for exception PS (0000 and 1111), for PS classes that do not generate RODC (0001, 0010, and 0011), and for PS classes that generate RODC (all other 11 identifiers).

The RODCs generated by the 11 classes that generate RODC (classes 4_4 to 14_4) become identifiers in themselves for PS classes larger than 14_4 and for open string PS.

These RODCs are characterized by a "Worth" factor—column 505 in FIG. 5. To give an example of such a worth factor, consider the single RODC generated by class 4_4. This RODC becomes a seven bit identifier (0100_111) for classes larger than 4_4. This 7 bit identifier can cover two class 5_4 configurations, 4 class 6_4 configurations, $2^{11}$ class 15_4 configurations, and so on, for every class, the worth factor increases by a factor of 2.

Next, the concepts of absolute identifier (AI) and root identifier (RI) are reviewed.

An absolute identifier represents the full description of the output configuration used to describe an input PS For example, if the input PS is a class 4_4 full PS, specifically 1_2_1_4, this corresponds to an output description of 0100_010, and this is known as the absolute identifier for the 1_2_1_4 full input PS. Of course, the AI for a full PS is always followed by an LB, but the LB is not part of the AI.

A root identifier (RI) is defined as the minimum common root to describe a group of AI within a single class only For example, considering class 4_4 for this discussion: the 7 configurations of class 4_4 can be described as 4+2+1 in term of primary binary numbers.

Accordingly, class 4_4 has three root identifiers, the first one representing a group of 4 configurations, the second one representing a group of 2, and the third one representing a group of 1 configuration.

The root identifier consists of the core identifier (see FIG. 7), followed by the root of each of the three groups (see FIG. 4): 0100_0 for the first group, 0100_10 for the second group, and 0100_110 for the third group.

Therefore, class 4_4 has three RI—a five bit RI representing a group of 4 configurations, a six bit RI representing a group of 2 configurations, and a seven bit RI representing a group of 1 configuration. The three root identifiers are called to be of class 5, class 6, respectively class 7.

The three RIs, as described, are primary RIs. These can be transformed in three 6 bit RI (with two configurations each) and one 7 bit RI, or can be transformed in seven 7 bit RI.

Figure 8:
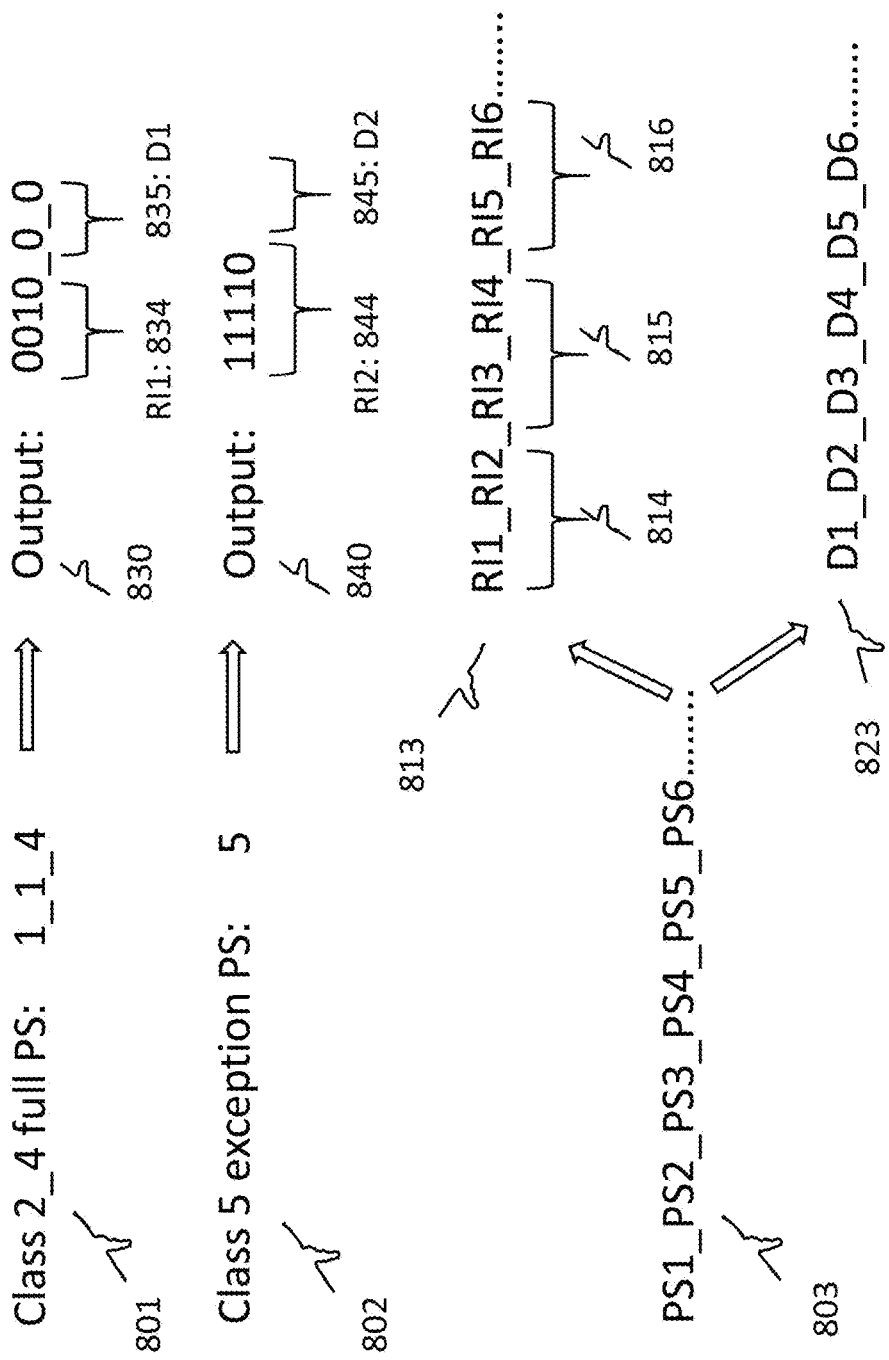
FIG. 8 is used to summarise the concepts of absolute identifier (AI) and root identifier (RI), as well as the procedure in which these are used, concepts and procedure used in one or more of the embodiments.

When an output is described using RIs, the output will consist of two strings, instead of 1 string, as exemplified in FIG. 8, where two PS are considered as an example for this discussion.

The first PS, 801, is a class 2_4 full PS. Normally, this is unitary described at the output as 830. Any such unitary output of a PS has two components: an RI (RI1, as 834) and a detail (DI1, as 835), detail part representing the remainder after removing the RI.

The second PS is an exception PS, 802, normally described as 840, and described in term of RI and detail as 844 and 845. Note that for exception PS, the detail part is null.

The regular output would be 803 (a single string, consisting of one output PS after another, in order).

When RI plus Detail description is used, the output will consist of two strings, 813 and 823, one string consisting of RIs, and the other string consisting of details of each output PS, in order. In the RI string, the RIs are paired, as shown by 814, 815, 816, for further processing, as will be shown. No further processing is performed in the detail string.

Figure 9:
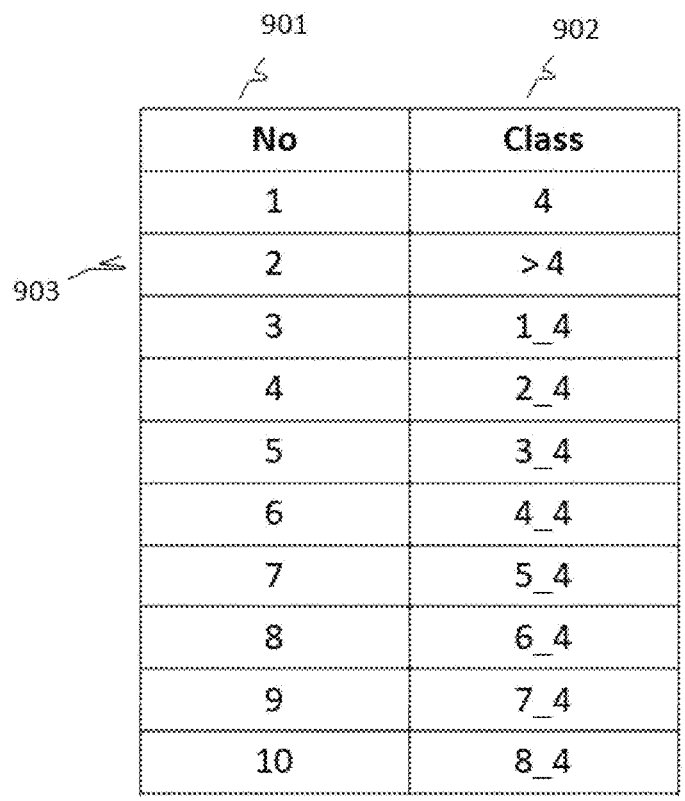

A set of limited number of PS classes is defined so that any IFDS can be fully described, compressed and then seamlessly reversed (decompressed). This limited number of PS classes is defined and discussed with reference to FIG. 9 and FIG. 10 (FIG. 10 is a continuation of FIG. 9). In these two figures:

901 column is an index, or a counter, showing how many PS classes

902 column is showing the corresponding PS class, for every index

The 903 row in FIG. 9 relates to exception PS (per the exception PS definition). In reality, there is a class for exception PS of class 5, one for class 6, and so on. Row 903 condenses all these classes into one entry. As shown in FIG. 7, exception PS of greater or equal to 5 same type bits uses the core identifier 1111 (5 is 1111_0, 6 is 1111_10, 7 is 1111_110, and so on).

Classes 1_4 to 14_4 do not require any further comments. These are full PS classes, and have been discussed also with reference to FIG. 7 and partly with reference to FIG. 5.

At row 904 in FIG. 10, variable k is introduced.

This k variable has a range from 1 to m, with m being the maximum value. Variable m can be minimum 1, case in which the range for k is 1 to 1. i.e. 1.

All classes (14+k)_4 are regular, full PS classes. Note that position 904 represents multiple entries. For example, if m=10, position 904 represents ten entries, i.e. ten classes, from 15_4 to 24_4. If m=1, position 904 represents one entry, i.e. class 15_4.

The value for m is chosen as one of the variables to increase the encryption strength. The larger the m value, the stronger the encryption, but the larger the complexity, where one of the implementation measures for complexity is the memory needs.

Since the memory needs is mentioned, clarifications are required. For example, if m=1, the memory needs needed to encrypt all configurations is about 190 k binary words of 22 bits. If m=13, the memory needs to encrypt all configurations reaches about 300M binary words of 34 bits. As m increases further, the trend is apparent (memory increases and the binary word necessary for one memory location increases).

Starting with 905, the maximum value of k, m, is relevant. To focus the discussion, m=1 (k=1) will be considered.

904, position 17, is class 15_4.

905 and 906 are classes 16_3 and 17_2.

Regular full PS classes, of format such as 15_4 (generally x_4) mean that in the 15 bits preceding the 4 same type bit DE termination, any combination of same type bit groups of 1, 2, and 3 bits can occur. Classes 16_3 and 17_2 have the same meaning, but the termination is 3, respectively 2 same type bits. Both classes 16_3 and 17_2 use a link bit just like a regular full PS, so, after the 3, respectively 2 termination, any number of bits of same type or opposite type as the termination can occur.

Positions 907 to 915 consist of three groups of classes: the 15_3 group, the 16_2 group, and the 17_1 group.
Each group consists of three classes: 15_3_1, 15_3_2, and 15_3_3, then 16_2_1, 16_2_2, and 1623, respectively 17_1_1, 17_1_2, and 17_1_3.
The meaning of the three numbers is as discussed above. For example 15_3_1: 15 supports any combination of 1, 2, and 3 same type bits, and 3 and 1 are terminations of 3 respectively 1 same type bit groups. The last bit in the 15 always changes value with the group of 3, which always changes value with the group of 1.
The first two numbers always make 18 when summed (15+3, 16+2, and 17+1).
15_3, 16_2 and 17_1 are the only possible combinations in an 18 bit in the defined conditions disclosed here.
The third bit is always 1, 2, and 3 for all three 15_3, 16_2, and 17_1 groups.
None of the nine classes require a link bit (LB). This is key, because it allows to "pack" double the amount of output combinations in the same number of bits. This also means that the bit coming after the 1, 2, respectively 3 same type bit termination, always changes value.
Note that all three groups generate 18_1, 18_2, and 18_3, in different configurations (as 15_3, 16_2, or 17_1). So, in order to close and have any combination possible, regular 18_4 full PS class (with LB) is needed to be added—and that is done on position 916 (position 29 for m=1).

Accordingly, the above collection of classes, as presented and discussed with regard to FIG. 9 and FIG. 10, permit the representation (or description) of any IFDS, using a predefined maximum number of bits.
In the case of m=1, this predefined maximum number of bits is 22 (18+4 from class 18_4).
In the case of m=13, this predefined number of bits is 34 (30+4 from class 30_4).
For any m, classes at positions 907 to 915 offer the needed open string, as defined. Classes at 907 to 915 are open string PS classes. These classes clearly have their own RI.
The number of required classes to cover any IFDS can therefore be varied, and there are consequences for the BCD method, as will be disclosed. For example, for m=1, 29 classes are needed. For m=13, 41 classes are needed. In other words, the number of classes required to cover any IFDS is 28+m.

Full PS, exception PS, and open string PS have all been clarified. A few words about a termination PS are required.
As described, the largest class, in term of bit length, is class 18_4 for m=1, and 30_4 for m=13. That is a 22 bit respectively 34 bit maximum PS, for a number of classes equal to 28+m. This indicates that the maximum PS can be written in term of number of classes as 28+m−7, or 21+m.
A termination PS is defined as a string of data, (21+m) bits or less in length, representing the last bits before the end of an IFDS.
In other words, the last (21+m) bits or less of an IFDS are not processed through the normal procedure as described in this disclosure, no matter what these last (21+m) bits or less contain, including if these bits contain a full PS of any class that fits in the (21+m) bit space, an open string, or (21+m) bits of same type (an exception PS). The following need to be clarified:

a. If any class starts before the (21+m) bit from last and extends into the last (21+m) bits of the IFDS, it is processed normally.
b. Anything within the last (21+m) bits of the IFDS, even if it is a class that would start and complete before the IFDS ends, is processed differently.

This different processing named above at b. is introduced next.
Since in the termination PS there is no restriction such as that imposed by the delimiter rule so that in the PS core there are only groups of 1, 2, and 3 same type bits, the termination PS can contain groups of any number of same type bits, from 1 to (21+m).
For every such group of "y" same type bits in the termination PS, the representation in the output will be (y−1) of 1 and 1 of 0.
Example 1: group of 1 same type bit (y=1). Representation is 0 (y−1) of 1 and 1 of 0, i.e. representation is bit 0.
Example 2: group of 14 same type bits (y=14). Representation is 13 (y−1) of 1 and 1 of 0, i.e. representation is 1111_1111_1111_1_0.
Always:
The last 0 from the representation of the bits of the termination PS in the output is dropped, since that last 0 is self understood, therefore redundant.
If the IFDS ends in the maximum applicable class (for example 18_4 for m=1 or 30_4 for m=13), the LB of that class is not necessary anymore, therefore will be dropped.

A termination PS does not have a specific class assignment, or RI. A termination PS is therefore left as is, and the hardware or software implementation of the compression will recognize the termination PS being the last PS in the IFDS and based on the above described rules.

A very well defined set of primary root identifiers (RI) can be derived for this 28+m set of PS classes. As defined and discussed, primary RI are RI that are not transformed, i.e. they represent each and every class as is.
For m=1, there are 29 classes of PS, as described above
In accordance to the derivation of primary RI, as outlined above, these 29 classes have primary RI of class 4 to class 21. The total number of primary RI for all these 29 PS classes is 148. Each of the 18 primary RI classes (4 to 21) has a well-defined number of RI members. For example, class 4 RI has 5 RI members, class 5 RI has 10 RI members, class 6 RI has 12 RI members, and so on.

As discussed with reference to FIG. 8, the output can be described by two strings: the RI string, and the detail string. The RI string can be further processed by pairing consecutive RI.
Processing of multiple RI (such as three, or four) can be developed, and this is in no way limiting to the content presented in this disclosure, with the title of example or otherwise.
When pairing two consecutive RI, the resulting pair has in-between 8 and 42 bits.
For example:
i. Example 1:
As mentioned, there are five primary RI of four bits (class 4 RI)
If, in the output, there are two consecutive class 4 RI, they create an eight bit unique pair. Since there are five such class 4 RIs, the pair can have 25 possible alternatives.

ii. Example 2:
An RI pair that has ten bits, can be constituted by classes of RI 4-6, 5-5, or 6-4. The total number of such alternatives for an RI pair of 10 bits is 220.

Every RI pair of 8 to 42 bits will accordingly have a set number of alternatives, or members. For one pair, the number of such members varies between minimum 16 (for pairs of 42 bits) and maximum 1276 (for pairs of 22 bits). The sum of all such members, for all RI pairs of 8 to 42 bits, is, in the case of m=1, 21904.

Further, similar to a PS, each of these 21904 RI pair members can be described, with an equivalent word that has an equal number of bits to the original.

For example, an 8 bit RI pair, that has 25 alternatives, can be described by 000_xxxxx, where xxxxx (five x) will cover the 25 alternatives. The seven remaining options (xxxxx has 32 positions) will be used as 14 positions for the nine bit RI pair.

Formalizing the above considerations, similar to the PS discussion, for these new RI constructs, the following can be defined:

RI pair classes.
An RI pair class is a group of RI pairs that result in the same number of bits. For example, an RI pair that has 8 bits (resulting from pairing an RI of 4 bits with an RI of 4 bits), is called to be of class 8. An RI pair that has 10 bits, resulting from pairing RI of (first RI-second RI) 4-6, or 5-5, or 6-4 bits, is called to be of class 10. For m=1, there will be therefore 35 RI pair classes, from class 8 to class 42. Each RI pair class has its own number of member RI pairs. As mentioned above, for example, class 8 has 25 members, class 10 has 220 members, class 22 has 1276 members, and class 42 has 16 members.

RI pair header and description. RI pair root identifiers (RI2).
A header and a description can be formulated for every RI pair, as described above for class 8 RI pair. Discussing the class 8 RI pair further in order to exemplify the concept, 000 in 000_xxxxx is the header, and _xxxxx is the description. Every RI pair class can be described using the same format, <header_description>.

This format <header_description> of an RI pair class is further detailed with respect to FIG. 11.
 i. The number of bits in the header plus the number of bits in the description must always be equal to the number of bits of the original RI pair class. For example, for class 8 RI pair (8 bit RI pair), the header is 3 bits, and the description is 5 bits, therefore 3+5=8. The <header_description> therefore represents an equivalent binary word to the original RI pair, where this equivalent binary word has an equal number of bits to the original RI pair and uniquely represents this original RI pair.
 ii. In FIG. 11, two RI pair classes are shown: class 8 and class 9. Class 8 has 25 RI pairs and is shown in full, class 9 has 100 RI pairs, and is shown only partial.
 iii. In FIG. 11, 1101 is a pair index for class 8, 1105 is a pair index for class 9, 1102 points to the description header used for class 8, 1106 points to the description header used for class 9, 1104 points to the description of each RI pair in class 8, 1108 points to the description of each RI pair in class 9, 1103 indicates class 8 RI pair, 1107 indicates class 9 RI pair.
 iv. Note that 1101 has values from 1 to 25 (for the 25 class 8 RI pair members). The 1105 index shows values between 26 and 41—that is 16 values out of 100 values necessary to describe all class 9 pair members. The 16 values shown are sufficient for this discussion.
 v. Note that the description of one RI pair constitutes of Header plus Description. For example, pair 1 of class 8 is 000_00000.
 vi. Note that the number of bits in the Header plus Description always equals class. For example, in class 8, the header is 3 bits, the description is 5 bits, for a total of 8 bits (class 8).
 vii. The header is always three bits, from 000 to 111, for all 35 classes. The description varies therefore in the range of (class minus header), i.e. in the range of 5 to 39 bits. Each of the eight headers is clearly used for multiple classes. Header 000 for example is used for class 8 and class 9. In class 9, the first 14 of 100 pairs use the 000 header, the next 64 pairs use the 001 header, and the last 32 pairs use the 010 header. In index 1105, 16 pairs of class 9 are shown since 16 pairs is sufficient to demonstrate one change in header. Note also that within one header, the description can have multiple lengths corresponding to the classes that the header represents. For example, as shown in FIG. 11, header 000 has two description lengths of 5 and 6 bits, respectively for class 8 and class 9 that the header 000 represents.
 viii. Similarly as the definition of root identifiers for a PS class described above, the RI pair Root Identifier (or RI2) consists of the header plus the minimum number of bits from the description that uniquely identifies a group of pairs within one class only.
  1. For example, for class 8, the RI2 are:
   a. 000_11000 (position 25 in index 1101), representing one pair.
   b. 000_10 (position 17 to 24), representing 8 pairs.
   c. 000_0 (position 1 to 16), representing 16 pairs.
 ix. Putting together all RI2 from all RI pairs, 40 RI2 classes, from 3 to 42, with multiple members in each RI2 class, are formed.

The BCD method is fundamentally based on mathematical probability and distribution models, where these models refer, for the BCD method, to the processing string (PS) and their constituent RI classes and members probabilities and distribution for the MPS scheme, to the RI pair classes and members probabilities and distribution for the MRI scheme, and to the RI2 classes and members probabilities and distribution for a version of the MPS scheme. In order to provide further refinements to the MPS scheme, several extensions will be disclosed.

Other variations and modifications will be easily apparent to the skilled person. Such variations and modifications may involve equivalent and other features which are already known in the art or are implied by the embodiments presented in this disclosure. Such variations and modifications may increase the performance of the BCD method. Accordingly, the schemes presented here are in no way limiting to the substance of the disclosure.

All the schemes exemplified next will be discussed when m=1 is considered. Highlights on the impact of variable m will be outlined, where appropriate.

1 Discussion of Relevant Probabilities

Given an arbitrary IFDS, each of the 29 PS classes, and within one PS class, each of its constituent members, or AI, has a well defined probability. Since a PS class is defined by a set of RI, for this disclosure, the probability of each RI within a PS class is of key interest.

The PS class and AI probabilities are shown in FIG. 12 and FIG. 13. FIG. 13 is a continuation of FIG. 12, so, the comments presented next apply to both figures, as appropriate.

With reference to FIG. 12 and FIG. 13, the PS classes are listed in Column 1201. The probability of each PS class is listed in Column 1202. The AI probability is listed in column 1203. For each PS class, the AI probability represents the class probability divided by the number of members (or AI) within that class.

For example, row 1204 refers to class 4_4. Class 4_4 has a probability of 5.47%, and each AI within class 4_4 has a probability of 0.78125% (representing 5.47% divided by 7 members in class 4_4).

In FIG. 13, 1305 details the PS class generically known as class 29 (class containing same type bits greater or equal to 5). Each case within class 29 is detailed in separate rows. Note that the probability drops with a factor of 2 from one row to another. The row >13 details the total probability of all cases 13 same type bits and greater, which is 0.02%, with individual probability following the same divide by 2 rule mentioned above.

For clarity, the distribution of RI for every PS class is shown in FIG. 14 and FIG. 15. FIG. 15 is a continuation of FIG. 14, so, the comments presented next apply to both figures, as appropriate.

Row 1401 details the 18 RI classes, from 4 to 21.

Column 1402 lists all the 29 PS classes

Item 1403 points to a specific RI in the table, namely exemplifying the RI class 6 for PS class 15_4. All other table contents are interpreted similarly.

Row 1501 details the Total sum of all RI of all classes besides class 4 PS and class "greater than 5" PS. For example, class 4 RI has a total of 4 RI from all PS classes.

Class 4 PS and class "greater than 5" PS are not included in row 1501 because these are detailed in row 1502.

Row 1503 details the total sum of all RI, similar to Row 1501, but with detailed inclusion of class 4 PS and class "greater than 5" PS.

Each RI class has a probability, starting with 6.25% for class 4 RI and monotonically decreasing by a factor of 2 for every RI class increase. For example, a class 5 RI will have a probability of 3.125% (6.25%/2), a class 6 RI will have a probability of 1.56125% (3.125%/2), and so on.

In a given arbitrary IFDS, every PS class, and therefore every RI, can occur, each with its own specific probability. Given all the above, the content of a 100 PS IFDS will have the following nominal distribution:

31.25 of class 4 RI
31.25 of class 5 RI
18.75 of class 6 RI
10.15625 of class 7 RI
4.6875 of class 8 RI
1.953125 of class 9 RI
0.9765625 of class 10 RI
0.5859375 of class 11 RI
0.390625 of class 12 RI to class 21 RI The above distribution is based on nominal distribution of RI within an IFDS, in accordance to their probabilities. However, in a real IFDS, every RI is subject to a distribution. The schemes presented in this disclosure use this distribution as one of the levers in order to create compression gain.

2 The Mathematical Processing String (Mps) Scheme

In a 100 PS IFDS, according to the above nominal probabilities and distribution, there are 31.25 class 4 RI. The closest integer is 31. Based on a nominal distribution of RI, these 31 class 4 RI are equally distributed in-between the members. Since there are five members in class 4 RI, M1, M2, M3, M4, and M5 (M for member), M1 to M4 will get 6 occurrences, and M5 will get 7 occurrences. To make the discussion more clear and easier to follow, it will be considered that each member will get 6 occurrences based on a nominal distribution. Also according to the nominal probabilities and distributing, in the 100 PS space, any consecutive two members of same type are spaced about 16 PS apart. However, in a real IFDS, every RI class and member within that class is subject to a distribution. The MPS scheme is employing this real-life distribution, stated probabilities, and disclosed embodiments, to create compression gain. There are three steps in order to create compression gain. These three steps are trigger, seed generation, and seed usage, each step featuring specific embodiments.

a. Trigger

The MPS scheme is activated, or triggered, when the distribution of members within a class meets one of the following two criteria:

The first criteria: one member has at least one more occurrence as compared to any other member. This criteria will be referred to in the rest of the document as criteria a, or c.a.

For class 4 RI, an example distribution of occurrences to meet this criteria, can be: M1-7, M2-6, M3-5, M4-6, M5-6.

The second criteria: two members have at least one more occurrence as compared to any other member. The occurrences of the named two members are not required to be equal. This criteria will be referred to in the rest of the document as criteria b. or c.b.

Example 1: M1-7, M2-7, M3-6, M4-5, M5-5
Example 2: M1-8, M2-7, M3-6, M4-4, M5-5

The member(s) that have more occurrences, as described above, are referred to for the rest of this disclosure as MPS trigger members, or trigger members.

b. Seed Generation

Once triggered, the MPS scheme is implemented based on a mathematically generated look-up table. For a hardware implementation of the scheme, this look-up table can be a ROM memory. The look-up table consists of:

For the first criteria defined above at c.a, the look-up table defines the unique link between combinations of five members taken one and combinations of five members taken two. This unique link is detailed in FIG. 16.

Combinations of m members taken n will be referred to in the rest of the document as Cm_n. For example, combinations of five taken two is C5_2.

For the second criteria defined above at c.b, the look-up table defines the unique link between C5_2 and C5_3. This unique link is detailed in FIG. 17.

Figure 16:
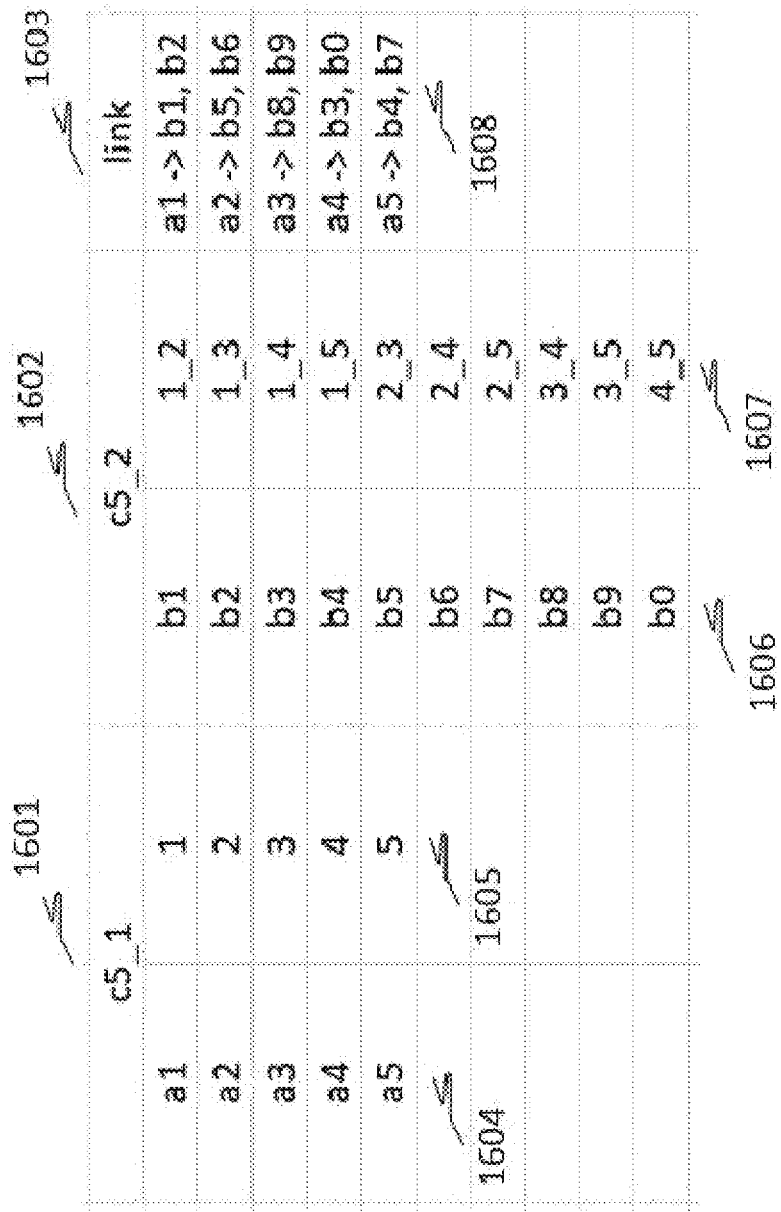

Discussing FIG. 16:

Item 1601 indicates that C5_1 are discussed in columns 1604 and 1605, where 1604 is an index, identifying each of the C5_1 combinations listed in column 1605.

Item 1602 indicates that C5_2 are discussed in columns 1606 and 1607, where 1606 is an index, identifying each of the C5_2 combinations listed in column 1607.

In column 1603 the unique link between C5_1 and C5_2 is detailed. The example 1608 points to the unique link between a5 in column 1604 and b4 and b7 in column 1606.

Note that since C5_2 has double of members as compared to C5_1, the unique link establishes a unique correspondence between a specific member in column 1604 and two unique members in column 1606. Every such link is unique in content, as exemplified in FIG. 16, so that it can be uniquely reversed at decompression.

Discussing FIG. 17:

Item 1701 indicates that C5_2 are discussed in columns 1704 and 1705, where 1704 is an index, identifying each of the C5_2 combinations listed in column 1705.

Item 1702 indicates that C5_3 are discussed in columns 1706 and 1707, where 1706 is an index, identifying each of the C5_3 combinations listed in column 1707.

In column 1703 the unique link between C5_2 and C5_3 is detailed. The example 1708 points to the unique link between a0 in column 1704 and b6 in column 1706.

Note that since C5_2 has the same number of members as C5_3, the unique link establishes a unique correspondence between a specific member in column 1704 and a unique member in column 1706, unique members that are used for that link only, as exemplified in FIG. 17.

The significance of creating this unique link (exemplified both in FIG. 16 and FIG. 17) for the MPS scheme and for this disclosure is as follows:

Significance 1:
Two, respectively one new members within that specific class are created. These new members are unassigned, and can be used for an assignment that creates gain.

These new members are created based on a unique and deterministic link, and the link can be uniquely reversed at decompression based on the IFDS content and other conditions, as exemplified next.

For the rest of this document, these unique new members that are created, as described above, will be referred to as generated members, or seeds.

Significance 2:
The unique link between Cm_k and Cm_(k+1), defines the unique link between trigger(s) and seed(s), unique link that is uniquely reversed at decompression.

From this perspective, examples 1608 (FIG. 16) respectively 1708 (FIG. 17) must be revisited A revised reading of 1608 is that when member 5 (column 1605) is the trigger according to criteria c.a, the seed must be either member 1 (through b4) or member 2 (through b7). That means that when during decompression, the content is read as for example 1 and 5, it is known that 5 was the trigger and 1 is the seed.

Similarly, a revised reading of 1708 is that when the trigger is member 4 and 5 (column 1705) according to criteria c.b, the seed must be member 3 (through b0). That means that when during decompression, the content is read as 3, 4, and 5, it is known that 4 and 5 were the trigger and 3 is the seed.

Significance 3:
The trigger definition and seed generation, as described above, have zero cost for the scheme. Everything is fundamented from class member distribution and a mathematical link. This zero cost is key for the MPS scheme.

An important note is that the larger the number of members in an RI class, the larger the number of seeds, and therefore the larger the opportunities to generate gain. An example is provided, to exemplify this note.

Consider that the MPS scheme is used for class 5 RI. Class 5 RI has 10 members (versus 5 members for class 4 RI).

There will be four applicable criteria instead of two criteria at class 4 RI. These four applicable criteria are:

One member has at least one more occurrence as compared to any other member. This criteria will require the link from C10_1 to C10_2. Four seeds are created.

Two members have at least one more occurrence as compared to any other member. The occurrences of the named two members are not required to be equal. This criteria requires the link from C10_2 to C10_3. Two seeds are created.

Three members have at least one more occurrence as compared to any other member. The occurrences of the named three members are not required to be equal. This criteria requires the link from C10_3 to C10_4. One seed is created.

Four members have at least one more occurrence as compared to any other member. The occurrences of the named four members are not required to be equal. This criteria requires the link from C10_4 to C10_5. One seed is created.

The scheme cannot create the criteria number five because the link from C10_5 to C10_6 will not be unique anymore (the destination combinations C10_6 has less members than the origin combinations C10_5).

Note that for 10 members in an RI class, the scheme can create a maximum of four seeds, versus a maximum of two seeds for an RI class of 5 members. As mentioned, this is key because the number of opportunities to create gain are increased.

When an RI class has multiple members, such as in the above example, there are more criteria that can trigger the MPS scheme. In the above example, there are four criteria that are possible. Of course, if may be chosen to cover only the high efficiency criteria that generates the largest number of seeds. It must be noted however that having more criteria to trigger the scheme is also beneficial, because of more opportunities to actually trigger and exercise the scheme to produce gain.

c. Using a Seed to Generate Gain (Seed Usage)

The member(s) that are generated, or the seed(s), are most likely an addition to existing members of same kind within that class. The only case when this is not true is when there are no existing members of the same type as the seed—this special case will be discussed later. An example of when the above statement is true is, as already discussed above, a seed of type M3 is generated on top of existing members of the same type that are naturally occurring within the IFDS. So, the first aspect that needs to be taken care of in order to use a seed is to differentiate between the naturally occurring members and the seed. This insures unique reconstruction at decompression. A person skilled in the art will appreciate that there are multiple ways to implement such differentiation, from straightforward to a complex differentiation algorithm. One example is discussed next, with reference to a 1028 PS IFDS.

According to nominal probabilities and distribution, in a 1028 PS IFDS, the following approximate nominal content occurs, content expressed in occurrences for one member of a class:
- 63 for class 4 RI (5 members, 315 occurrences)
- 32 for class 5 RI (10 members, 320 occurrences)
- 16 for class 6 RI (12 members, 192 occurrences)
- 8 for class 7 RI (13 members, 104 occurrences)
- 4 for class 8 RI (12 members, 48 occurrences)
- 2 for class 9 RI (10 members, 20 occurrences)
- 1 for class 10 RI (10 members, 10 occurrences)
- 10 for Class 11 to class 21 (10 occurrences)

A class 4 RI seed will nominally have 63 occurrences, at a nominal distance of 15 PS from each other, where, in real life, this distance can have a distribution between 0 (two PS characterized by same RI is one after another) to 1000 (all RI of same class and member are all together). Practically:
- The MPS scheme will analyze the 1028 PS IFDS, and determine the distribution of the naturally occurring members of the same type as the seed.
- Based on this distribution, the optimal distance in-between two consecutive members is determined, where this optimal distance is the maximum distance that can be created when the minimum numbers of members do not meet this distance. This optimal distance is called search range, the members that do not meet this distance are called outliers, and the members that create a PS spacing distance value equal or greater than the search range are called directors.
- For example, for the following distribution of distances between consecutive members of a class, a search range and number of outliers are defined:
  - 15, 4, 22, 3, 2, 18, 16, 14, 17, 19, 22 (11 occurrences in a 152 PS IFDS)
  - Search range: 16, Outliers: 4 (15, 3, 2, 14), Directors: 7 (15+4, 22, 3+2+18, 16, 14+17, 19, 22)
  - Alternatively: Search range: 14, Outliers: 3 (4, 3, 2), Directors: 8 (15, 4+22, 3+2+18. 16, 14, 17, 19, 22)
- The difference in-between the two alternatives consists in cost and usage efficiency
- Cost:
  - The search range must be specified in clear.
    - In both cases, considering that a search range of 12 is the minimum that can be accepted, two bits are used to specify the search range, with the configuration of these two bits as 11 for the 16, and 01 for the 14.
  - The second cost element is the representation of the outliers.
    - Say that the seed is 0001 RI (representing class 1_4 PS). In the original RI string, 0001 will show up for all 11 occurrences. However, the outliers will be differentiated by becoming 0001_0 (the 0 bit at the end is added). This added bit represents a cost of 1
    - Therefore, this cost will be 4 (for the 4 outliers case), respectively 3 (for the 3 outliers case)
  - Total cost therefore: 6 vs. 5 for the two alternatives
- Usage efficiency:
  - The gain can be obtained only inside the search range for every director. For example, for a director of value 22 and a search range of 14, 14 PS are used for gain, and 8 PS are wasted.

A straightforward way to obtain the usage efficiency (UE) for an implementation, is according to the following equation:

$$UE = (\text{Number of directors}) * (\text{Search range}) / (\text{Total PS in IFDS})$$

According to this equation:

$$UE1 = 7*16/152 = 112/152$$

$$UE2 = 8*14/152 = 112/152$$

Since the usage efficiency is equal in the two cases and the cost is smaller for the second case, with the search range of 14, the second case is preferred.

Generally the case that provides the largest net gain is chosen, where net gain equals gross gain minus cost, with the gross gain being directly proportional to the usage efficiency.

The gross gain is derived as follows:
- Within the search range, a derivative of the seed, 0001_0, is used for the outliers
- The other derivative of the seed, 0001_1 is used to replace an RI of a number of bits at least equal to number of bits in the derivative plus one. This RI that is being replaced by the seed or seed derivative is called for the rest of this disclosure a replaced RI.
  - For example, in this case, the derivative has five bits, therefore, if the replaced RI is of class 6 (6 bits), the gain per occurrence is 1, if the replaced RI is of class 11, the gain per occurrence is 4.
- Several extensions that will enhance the gross gain will be disclosed later in this disclosure (such as the chain extension, blanket extension, etc.).

The MPS scheme will analyze possible scenarios, and will choose to implement the scenario that will produce the largest net gain. Possible scenarios may include partitioning of the IFDS in slices of various sizes, and choosing the size for an IFDS slice, as will be detailed later.

An alternative method to cost and the representation of outliers

For the implementation described above, the cost consisted of bits to specify search range, and one bit per outlier (the added _0 termination). For such implementation, the minimum replaced RI to produce gain was shown to be of class 6.

An alternative implementation is disclosed. The main advantage is that for this alternative implementation, the minimum replaced RI to produce gain becomes of class 5, with the gain advantage as will be described. The upfront cost is increased however. Therefore, there is a trade-off, as explained next, when one or the other implementation is producing a better net gain.

This alternative implementation consists of specifying the outliers in each director, and skipping the director with no outlier. In order to do that:
- Number of outliers for the current IFDS slice is specified in clear, as part of the cost. The search range however is not needed to be specified.
- A sweep over all directors is pursued using the following headers:
  - 0→jump to the second director
  - 10→jump to the next director
  - 11→stay in the current director The header 10 and 11 are always followed by the specific PS that has the seed RI. This PS that has the seed RI in the current director is specified using four bits, so the position of the seed RI can be up to 16. The maximum value used for this position, in all directors, is the search range, and that is why the search range is not required to be specified in the cost section upfront.

The outlier is removed from the director, so, the four bits of the outlier breaks even with the four bits used above to describe the position of the outlier The two examples above are discussed here:
  15, 4, 22, 3, 2, 18, 16, 14, 17, 19, 22 (11 occurrences in a 152 PS IFDS)
  Search range: 16, Outliers: 4 (15, 3, 2, 14), Directors: 7 (15+4, 22, 3+2+18, 16, 14+17, 19, 22)
    11 (4 outliners)
    10_1110 (stay in the current director, describe outlier 15)
    0 (jump to the second director)
    10_0011 (stay in the current director, describe outlier 3)
    10_0010 (stay in the current director, describe outlier 2)
    0 (jump to the second director)
    10_1101 (stay in the current director, describe outlier 14)
    Total cost: 2+6+1+6+6+1+6-4*4=12
    The cost is reduced by opening up class 5 for gross gain, which for 112 PS generates an extra gain of 4. So, the final cost is 8. The cost for the previous method was 6, so, in this case, the previous method is still better.
  Alternatively: Search range: 14, Outliers: 3 (4, 3, 2), Directors: 8 (15, 4+22, 3+2+18. 16, 14, 17, 19, 22)
    10 (3 outlines)
    10_0100 (jump to next director, describe outlier 4)
    10_0011 (jump to next director, describe outlier 3)
    11_0010 (stay in current director, describe outlier 2)
    Total cost: 2+6+6+6-3*4=8
    Final cost 8−4=4. The cost for the previous method was 5, so, in this case, the current method is better.

The two methods can be combined for further cost optimization. For example, the description of an outlier can be broken in two parts, where one part is described by the first method and the second part is described by the second method, such as:
  The first 8 PS in the search range are described using the first method. The advantage is that the search range does not need to be specified, since a search range less than 8, for this type of implementation of the scheme, is always true.
  The last 8 PS in the search range are described using the second method. The advantage is that the outlier position, after the header, has only have to use three bits (instead of four), reducing therefore the cost.
  Everything else remains the same, such as the fact that in the last eight PS of the search range, class 5 RI can be used for gain.
  The MPS scheme will test these two methods, or a combination of them, in order to determine the optimal cost, before making the implementation decision.

There are multiple variations and alternatives in defining and determining the optimal search range and in defining the definition and sweep approach through the directors. For example:

Only search ranges above 16 can be defined, with multiple outliers. Such an example is a sequence of 60 class 4 RI of a specific member: 1-31-2-30-3-29-4-28-5-27-6-26-7-27-8-24-9-23-10-22-11-21-12-20-13-19-14-18-15-17, repeated twice. In this case, the search range can be defined as 32, with 30 outliers and 30 directors. If the first method above is used to sweep through the directors, the cost will be 5+30, the usage efficiency will be 100%, and the gross gain will be 41 with a net gain of 6.

Note that the maximum number of outliers for the first method above is 41 (gross gain for 100% use efficiency) minus overhead cost (such as specifying the search range and the scheme trigger), or as high as 41 (if default trigger and search range is implied, i.e. of zero cost), or a typical value in the low-mid 30's when options are specified in clear.

For the second method, the gross gain for 100% efficiency is 71. The cost can be optimized. For example, in the case of multiple outliers and no directors without outliers, the 0-10-11 scheme described above can be modified to (0→jump to next director and process, 1→stay in the current director and process). In this case, for a 32 search range (described by 5 bit), the cost will be 60+5, and therefore the net gain will be 6, making the two methods equivalent. The maximum number of outliers for this version of the second method is also in the low-mid 30's, from this perspective with a slight advantage for the first method.

The minimum search range with no outliers can be 2, giving a use efficiency of 12% (for 60 directors, each of size 16), for a gross gain of about 8 (12% of 71). The minimum search range, for the same outcome, can be 4, for 30 directors of size 32. The cost will consist in scheme trigger and specifying the scheme details/versions (for example, a four bit tag will cover all these scheme details/versions), so, the net gain can be in the 2-3 range.

The search range may be specified with respect to a different reference rather than the reference used in the above examples, which is the RI entering one director. Such different reference can be with respect to the RI exiting the director, or a floating reference within the director.
  Using the RI exiting the director changes the dynamics of using the RI/seed distribution. For example, for the search range of 2 discussed above, in a director size of 16, it changes the focus from using the PS number 1 and 2 from every director to generate gain, to using the PS number 14 and 15 from every director to generate gain. That is significant, since in a specific IFDS, the distribution may be more towards having PS of the RI/seed type to be more distant (14, 15) than tight together (1, 2).
  On the same considerations, a certain PS may have a search range with no outliers between PS number 7 and 10 within a director of 16 PS. In this case, a number of bits (such as four bits) can be used to specify, in the cost section, a floating reference for the search range (which in this case, the floating reference will be 7, i.e. the 7th PS in every director from the PS entering every director is defining the start of the search range).
  It should be appreciated that a floating reference for a search range with outliers, and other variations of the above, can be created.

The MPS scheme will analyze, validate, and implement the optimal version to achieve the highest net gain.

As discussed above, the MPS scheme creates compression gain by replacing an RI of a higher order (larger number of bits) than the seed. In order to preserve the unique path during decompression, the replaced RI must be specified with minimal cost, or with a cost that is smaller than the gain that is being achieved during this replacement operation. There are several approaches to do this, as disclosed below. These approaches are classified as zero cost approaches and non-zero cost approaches.

Zero Cost Approaches:
  First approach: Use a pre-defined RI.
    For example, use the class 6 RI 010_001. The drawback here is that this pre-defined RI may not have natural occurrences in the respective IFDS or in the applicable search range-clearly if this is the case, the scheme cannot produce gain and the trigger is wasted.
  Second approach: In an applicable RI class, use an RI that meets a pre-defined criteria.
    For example, the applicable RI class is class 6 RI. In this class, the pre-defined criteria is to take the first member in the class, in mathematical order of the members, that has non-zero occurrences in the respective IFDS or in the applicable search range. If in this applicable class there is no member that has non-zero occurrences, the next class in mathematical order that has at least a member with non-zero occurrences is taken.
    The criteria may have any complexity. Increased complexity may also involve some cost. For example, consider the applicable class in class 6 RI. Class 6 RI has 12 members. The criteria may be "take the member that has the largest number of occurrences" in the IFDS or in the applicable search range. If all 12 members have non-zero occurrences, then the cost is still zero. If at least one member has zero occurrences, the member with the largest number of occurrences has to be specified in clear, and the cost will be 4 bits (to cover the 12 members).

Non-Zero Cost Approaches:
  First approach: Specify the replaced RI in clear
    This approach is particularly useful when in an IFDS a low probability RI of a high class occurs (such as a class 21 RI) and the gain obtained from engaging this RI is not exceeds otherwise.
      To implement this, a pool of such low probability high order class RI is created. For example, this pool may comprise all RI of class 18 and larger, accounting for 16 members according to FIG. 15. These 16 members can be uniquely described using four bits.
      In these conditions, a class 4 seed that is replacing a class 18 RI will produce a gross gain of 10. If the same seed will replace a class 21 RI will produce a gross gain of 13. The net gain is derived accounting for all other applicable scheme conditions, such as possibly a trigger specification, a search range specification, etc.
  Second approach: Optimization, cost function approach
    All RI (classes and members) in the IFDS or search range are considered as a candidate for replaced RI. The RI candidate that produces the largest gain is chosen, where this chosen RI can be an RI with the largest number of occurrences, or an RI of highest class available, or other quality. The approach has a cost equal to specifying the RI and depending on the situation, other secondary cost.
  Third approach: Seed-related replaced RI
    Every of the 148 RI that exist in the 18 RI classes have a well defined number of corresponding bits in the detail section. In this approach, only RI of higher class that has the same number of detail bits as the seed are chosen as replaced RI.
    For this set of RI as described, any zero cost or non-zero cost approach may apply.
    This approach pushes a different set of choices that may optimize the cost for a specific IFDS, optimization which otherwise is not possible. The additional cost in using this approach consists only in one more alternative specification/option for the total scheme.

Other Important Remarks:
  The original IFDS can be broken down into consecutive slices. For example, a 10,000 PS IFDS can be broken in 100 slices of 100 PS each, or in 20 slices of 500 PS each, or in 10 slices of 1000 PS each. Having a constant, predetermined slice size is preferred, but a custom variable slice size is implementable if gain optimizations, by doing so, are possible. When a custom slice size is used, extra bits are added to the scheme cost, to indicate the slice size, such as in increments of 100. For a constant, predetermined slice size, this cost is zero.
  When there are multiple IFDS slices, as described above, since there is a cost to trigger each slice, this cost adds up. While the cost to trigger each slice may be compensated by the gross gain in the slice itself, this cost can be further compensated external to the subject slice when one trigger cost is used to trigger multiple slices. For example:
    One bit is used to trigger one slice. If the bit is 1, the conditions to trigger the scheme are met, if the bit is zero, the slice is not triggered. If there are 100 slices in the IFDS, the cost will be 100, no matter how many slices are actually triggered. Of course, if there are more such slices that are not triggered than there are triggered, this partition in 100 slices may not be the optimal partition, and the scheme will choose a different partition. In this example, 21 slices cannot be triggered, and 79 slices can be triggered, where each slice that can be triggered produces an intrinsic gain of 2.
      If the trigger cost is one bit per slice, the net gain of the 100 slices IFDS will be 79*2−100=58.
      If the slices are triggered with one bit per a group of two slices, then the trigger cost will be 50. In the worst case distribution, 21 of the 50 groups will not be triggered, and 29 of the 50 groups will be triggered. The 29 groups that are triggered will create a gain of 29*2*2=116, which will compensate the cost of 50, and create a net gain of 66 for the 100 slice IFDS, greater than the initial 58.
  Increasing the IFDS slice (such as a 500 PS slice versus 100 PS slice), will have the effect that lower probability RI can occur with good likelihood in the IFDS.
  A replaced RI that has a lower class has a larger probability of occurrence and more occurrences in a given IFDS slice, therefore creating a larger compression gain. For example, for a class 4 seed and a three bit initial cost, in order to create a one bit net gain, it will take one occurrence of a class 8 replaced RI, or two occurrences of a class 6 replaced RI, or four occurrences of a class 5 replaced RI.

At decompression, the only member that can have the number of occurrences equal or greater than the trigger member is the seed type. There are several possibilities that the decompression may interpret:

Seed type has a smaller number of occurrences than the trigger member. In this case, the decompression process may look at all members and can consider the original trigger member as the seed type of another trigger member. For example, with respect to FIG. 16:

Original trigger is a1, and the seed is a2, through the b1 link. Originally, a1 had six occurrences, and a2 had four occurrences. The search range of a2 is determined to be 12, and in this range, the seed occurs once, therefore, at the end, a1 has six occurrences and a2 has five occurrences, with one a2 occurrence in the search range.

Another member, a5, has five occurrences. The decompression can interpret a5 as the trigger, and through the b4 link, a1 becomes the seed, where at least two a1 members are in the a2 search range determined above. Having at least two a1 members in the search range is required, in order to meet the c.a criteria for a5. In addition, no other member must have more than four occurrences, so that the new presumed trigger a5 can hold as the presumed trigger in the new conditions (c.a criteria). Note that these conditions to have a valid trigger are already very restrictive. If all these conditions are met, the decompression cannot uniquely determine the trigger-seed pair (can be either a1-a2, or a5-a1). To resolve this, there are two options:

The search range of a2 must be reduces to the search range of a1, in other words, in the a2 search range there must be no a1, while the a2 seed must still occur in the reduced a1 search range.

Reducing the search range may not be always desired, because by reducing the search range, the usage efficiency is reduced, and the possibility therefore to locate replaced RI in the search range is reduced, leading to the impossibility to create gain. In such case, the solution is to add a bit upfront, as cost. If this bit is 0, it means that the first option, in mathematical order, is true (in this case a1-a2). If this bit is 1, the second option in mathematical order is true (in this case a5-a1)

Note yet another restrictive condition that may invalidate the presumed a5 trigger, in addition to the restrictive conditions mentioned above: if the a5 member has five occurrences but the a1 member has no occurrences in the a2 search range, the unique decompression path is a1-a2, and the a2 search range, as determined, remains valid. Therefore, the decompression can uniquely determine the trigger-seed pair as a1-a2, by invalidating the a5-a1 pair because of not finding a1 occurrences in the search range.

Seed type has a larger number of occurrences than the trigger member. In this case, the decompression may interpret the seed type as being originally the trigger of a different member. Considering as an example a1 with six occurrences and a2 with five occurrences originally, and a2 as the original seed having two occurrences in the search range, leans to a1 having six and a2 having seven. The decompression may interpret a2 as the trigger, and a3 (through the b5 link, see FIG. 16) as the seed. For this to be valid, a3 must have at least one occurrence in the search range, and the total number of occurrences (in and out of search range) must not exceed six (to meet the c.a criteria initially). Note that this applies for both in and out of search range, because out of search range only does not make sense to evaluate since this is not a real seed. If all these conditions meet, than a2-a3 is a candidate that creates conflict with the real a1-a2 case during decompression. The solutions presented above to resolve the a1-a2, a5-a1 conflict apply.

Seed type has an equal number of occurrences as trigger member. This situation cannot create any conflict at decompression, because the unique pair cannot be generated by any other member combination to meet the c.a criteria.

As a note, the situations when the MPS scheme cannot be triggered for an IFDS slice are limited. For example such situations are (in an IFDS slice, three or more out of five class 4 RI members have an equal number of occurrences AND the rest of the members have a lower number of occurrences) OR (in same IFDS slice, five or more out of ten class 5 RI members have an equal number of occurrences AND the rest of the members have a lower number of occurrences) OR (<similar formulation for at least the class 6 RI member group>) OR (the search range content is not producing sufficient gain to compensate the scheme cost).

The last of the situations mentioned above (the search range content is not producing sufficient gain to compensate the scheme cost) is further minimized by several enhancement extensions. These are disclosed next.

These enhancement extensions can also be implemented as stand-alone schemes, however, these extensions will be introduced focusing on the enhancements that can be brought to the MPS scheme. The enhancements that these extensions bring to the MPS scheme refer to opportunities for increased seed usage efficiency which translates in additional compression gain, as described next for each such enhancement extension.

1 the Chain Extension

As described for the MPS scheme, a seed, or a generated member, is replacing a so-called replaced RI, in order to generate gain. The chain extension is providing additional options for the replaced RI in order to generate additional gain.

As mentioned, the content of an IFDS slice for which the MPS scheme is being engaged, consists of various PS classes. Corresponding to these PS classes, AI and RI are identified. For m=1, there are 29 classes, with a total of almost 190,000 configurations (or AI) of 7 to 21 bits each, and a total of 148 RI of 4-to-21 bits each.

For the IFDS slice for which the MPS scheme is being engaged, the content in term of PS classes and RI that occurs in the search range of the current MPS scheme is being formed. This content is used in the chain scheme as follows:

A replaced RI is being identified, as described for the MPS scheme.

Once the seed is replacing the replaced RI, this replaced RI becomes unassigned. The key aspect here is that this replaced RI is identified (i.e. it is known) and is unassigned (i.e. available). These qualities of the replaced RI makes it ideal means for use to generate additional gain by replacing the next higher order RI occurring in the search range of the IFDS slice. This process is repeated in chain, until the highest order RI in the IFDS search range.

For example:
- In the search range of the IFDS slice, there are PS represented by RI of class 4, 5, 6, 8, 10, 12, and 20, all of one occurrence each.
- The seed, or the generated member, is a class 4 RI.
- The class 4 RI seed will replace a class 5 RI for a gain of 1 per occurrence. This is the first link in the chain.
- This class 5 RI will replace a class 6 RI (second link in the chain), 6 RI will replace a class 8 RI (third link in the chain), which will replace a class 10 RI (fourth link in the chain), which will replace a class 12 RI (fifth link in the chain), which will replace a class 20 RI (sixth and last link in the chain).
- If no additional cost would be required to cover this chain, the scheme gain will be (all per occurrence of each RI in the chain—if an RI has more than one occurrence, the gain multiplies with the number of occurrences for that RI):
  - 1 bit from 4 bit seed replacing 5 bit replaced RI
  - 1 bit from 5 bit RI replacing 6 bit RI (second link)
  - 2 bit from 6 bit RI replacing 8 bit RI (third link)
  - 2 bit from 8 bit RI replacing 10 bit RI (fourth link)
  - 2 bit from 10 bit RI replacing 12 bit RI (fifth link)
  - 8 bit from 12 bit RI replacing 20 bit RI (sixth link)
  - Total: 16 bit gain. Minus 1 bit cost, totals 15 bit net gain. Without the chain extension, the scheme gain will only be 1 bit (from the seed replacing a 6 bit replaced RI. Or if the first approach in the non-zero cost approaches is used here for the 20 bit RI, the net gain will be 20−(1+4+4)=11, still smaller than the 15 net gain obtained with the chain extension.

Cost considerations to cover the chain in order to insure unique restoration during decompression are discussed next.

In the exposition describing the cost considerations to cover the above introduced chain, an example has been considered, where the example featured a seed of class 4 RI for an IFDS slice of 100 PS. Only the intrinsic cost to cover the chain has been discussed, all other cost has been considered external to the chain. Such external cost may be as small as 1 bit per a group of IFDS slices, as described above.

In an IFDS slice of 100 PS, as discussed above, each RI class is represented in different proportions. Within each RI class, every member is represented in applicable proportions. For example, as discussed above, class 4 RI will be represented by 30 occurrences, with 6 occurrences per member. Class 5 RI will be represented by 30 occurrences, with 3 occurrences per member. Class 10 RI will be represented by 1 occurrence with only one out of the 10 members being represented, the rest of the nine members having zero occurrences. Of course, these representations consider nominal distribution and probabilities, which may be different from a real-life distribution, as discussed.

The approach in forming the chain is as follows:
For every RI class greater than the seed class
- The first non-zero occurrence member in ascending member order constitutes a chain link
- If within an RI class all members have zero occurrences, that RI class is skipped
- The last RI class that features a non-zero member must be written in the output in clear.

Example

In a 100 PS IFDS slice, the following content is recorded:
- Class 4 RI: 31 occurrences, with the first member having 5 occurrences
- Class 5 RI: 31 occurrences, with first member having 2
- Class 6 RI: 20 occurrences, with first member having 1
- Class 7 RI: 7 occurrences, with first member having 1
- Class 8 RI: 6 occurrences, with first member having 1
- Class 9 RI: 2 occurrences, with first member having 1
- Class 10 RI: 1 occurrence, with first member having 1
- Class 12 RI: 1 occurrence, with first member having 1
- Class 17 RI: 1 occurrence, with first member having 1

The chain:
- Seed replaces first of class 5 (2 occurrences), which replaces first of class 6 (1), which replaces first of class 7 (1), which replaces first of class 8 (1), which replaces first of class 9 (1), which replaces first of class 10 (1), which replaces first of class 12 (1), which replaces first of class 17 (1), which is written in the output.

The gain:
- Net gain equals 1*(2) plus 1*(1) plus 1*(1) plus 1*(1) plus 1*(1) plus 1*(1) plus 2*(1) plus 5*(1) minus (4+3) equals 7 bits.

Explanations:
- For every chain link, the gain equals the difference between the number of bits in the replaced RI and the number of bits in the replacing RI times the number of applicable occurrences
  - Example: when the seed replaces the class 5 RI, the difference in the number of bits is 1 and the number of occurrences are two, therefore gain is 1*(2)
  - Example: when class 12 RI replaces class 17 RI, the difference in the number of bits is 5 and the number of occurrences are 1, therefore gain is 5*(1)
- The (4+3), as in "minus (4+3) is the intrinsic cost.

Intrinsic cost:
(4+3) equals 7 bits.

Explanations:
- The 4 as in (4+3) represents four bits indicating how many classes, from the last recorded class is the next non-zero class that is written in the output. For example, in this case, the last recorded class is class 12, and there are five classes from class 12 (i.e. class 17), where class 17 is written in the output. Therefore, the configuration of the four bits will be 0101.
- The 3 as in (4+3) represents three bits describing which member in class 17 is non-zero. Class 17 has 6 members (see FIG. 12), therefore three bits are required to indicate the non-zero member that is considered.
- This (4+3) description of the class/member written in the output is preferred because it gives a lower cost versus the alternative of direct writing of the class/member in the output which in this case would cost 17 bits.
- Note that this intrinsic cost can be lower or higher than the cost exemplified here. Lower for example if the last recorded class is for example 13, case in which only 3 bits (instead of 4) are required to specify which class is written in the output (there are 21 classes). And lower if the number of members of the class written in the output is smaller (such as class 19 which has only 3 members, therefore two bits instead of three suffice). Higher number of bits are recorded exactly in the opposite cases-very unlikely to have a last recorded class lower than 5, to require five bits instead of four, but possible to have a class written in the output with the number of members to require four bits instead of three (such as class 16 being the most upper class with number of members greater than 8).

Reconstruction Considerations at Decompression:

During decompression, the data reconstruction from the chain must be uniquely reversed. This is possible with the information presented above to describe the chain, as follows:

A scheme header (external to the chain) indicates that the chain extension is used The seed (the first link in the chain) can be clearly determined The last link in the chain is written in the output (in the (4+3) format)

The deconstruction of the chain is performed in reverse as compared to the process that occurred at compression:

From the content of the IFDS slice, the highest class RI is extracted. This RI is nothing else but the "last recorded class" referred above.

From the 4 bits in the (4+3), the class of the class written in the output is determined, and from the 3 bits in the (4+3), the member of this class is determined.

At this point, considering the example described above, the class 17 PS is restored, and the class 12 RI is known.

From the IFDS content, it will be immediately apparent which RI classes are represented. The original IFDS content, before compression (chain creation) is described above. After compression (chain creation), the content is:

Class 4 RI: 31 naturally occurring occurrences, plus two 5 occurrences which were originally of class 5 RI and these are in the search range of the MPS scheme Class 5 RI: 29 naturally occurring occurrences plus one which was originally of class 6 RI Class 6 RI: 19, plus one which was class 7

Class 7 RI: 6, plus one which was class 8

Class 8 RI: 5, plus one which was class 9

Class 9 RI: 1, plus one which was class 10

Class 10 RI: one which was originally class 12

Class 12 RI: one which was originally class 17

From this content, the reverse process will indicate:

Class 17 RI reconstruction will release class 12 RI and reconstruct the class 12 PS by matching into the next existing class which is the single class 10 RI.

The class 10 RI is released and will reconstruct the class 10 PS by matching into the next existing class which is class 9. Since class 9 has two existing members, the first member in the member order is the applicable member The process is similarly repeated up to class 5 RI, reconstructing therefore class 9, class 8, class 7, and class 6 PS.

After class 6 PS reconstruction, the class 5 RI is released. This class 5 RI is going to be used wherever the seed is used. The locations where the seed is used are determined from the search range, as described above on previous occasions, such as when the search range was introduced. Once these locations are determined, the class 5 PS are reconstructed using the released class 5 RI.

With this, the unique reconstruction is complete.

At this point, the introduction of the chain extension, focusing on the enhancement that brings to the MPS scheme is complete. To a person skilled in the art, it will be apparent that multiple versions of the chain extension are possible, and one or more versions of the chain extension that is applied independently from the MPS scheme are possible. One such independent version of the chain extension can be when the seed is an RI member of zero occurrences.

2 the Blanket Extension

The blanket extension is an enhancement of chain extension. As described above, the chain extension builds a chain from a seed. This seed may be created by the MPS scheme, but as mentioned, the chain scheme can be independent as well, namely when the seed is generated naturally, such as when the seed represents an RI member, or an AI of zero occurrences.

The blanket extension starts from transforming a seed into a blanket of seeds of higher order. For example, a class 4 seed generated by the MPS scheme is equivalent to a blanket of seeds of class 5 and larger.

To illustrate this, if 0010 is the class 4 seed, this is equivalent to two class 5 seeds 00100 and 00101. The 00100 seed remains a class 5 seed, while the 00101 seed is transformed in two class 6 seeds, 001010 and 001011. Then 001010 seed remains the class 6 seed, and the 001011 is transformed in two class 7 seeds, and so on, the process continues to any level seed. The last level seed, when it is decided to stop the blanket (such as at class 21 seed) will have two members.

Therefore, a blanket of seeds is created, where, in order to be created, this blanket of seeds needs a unique seed of one level lower than the lowest level seed in the blanket.

For each of the seeds in this blanket, a chain extension is created.

So, for example, the original class 4 seed is created by the MPS scheme. This class 4 seed generated the blanket of seeds, and then for each of the seeds in the blanket, a chain extension is created. Similar as discussed above, the blanket extension can be independent of the MPS scheme if the original seed is for example an RI or AI of zero occurrences.

The main benefit of the blanket extension is that it creates the opportunity to cover multiple members in an RI class. For example, in the chain extension discussed above, where an RI class had multiple members occurring in the PS slice, only the first member in the natural mathematical order member is included in the chain. In a blanket scheme, multiple members of an RI class can be covered, since there are multiple chains that are created-one chain for every seed in the blanket.

Essentially, the number of members from an RI class that can be covered in a blanket scheme equals to (current RI class) minus (original seed class+1).

For example, for class 10 RI class when the original seed class is class 4, (10) minus (4+1), equal five members (out of 10 members that class 10 RI has) can be covered.

The main drawback of the blanket extension is that an RI class that is of an immediate order to the seed is sacrificed to create the blanket. For example, for a class 4 seed, the chain extension can have the first replaced RI to be of class 5. For the blanket extension, this first replaced RI is of class 6.

From the above exposition of the blanket extension, it is apparent that the blanket extension is particularly beneficial for a large IFDS slice, so that all, or most members of all RI classes are represented (have at least one occurrence). There are 148 members in 17 RI classes, but in order for all 148 members to be represented, a large IFDS slice is required, since, as shown, the probability of members drop by a factor of two per one RI class increase. Also, from the gain perspective, the blanket extension benefits if multiple occurrences occur in the IFDS slice for the same member in an RI class. It is therefore clear that the blanket extension benefits from having a large IFDS slice, or a full IFDS.

3 the Swap Extension

As shown for the Chain extension, if within an RI class there are multiple members occurring, only the first member, in the natural mathematical order of members, will be part of the extension. Even for the Blanket extension, not necessarily all members of a class will be considered. In both these two extensions, a member that may have the highest number of occurrences may simply be not considered as part of the extension. The swap extension is a remedy to this situation. There are multiple scenarios where the principle of the swap extension can be used, but again, similarly to the chain extension and blanket extension, the focus will be on the use of the swap extension in the MPS scheme context. Similarly as mentioned for the chain extension and blanket extension, the swap extension can be independent of the MPS scheme, such as when a low class RI with low number of occurrences is swapped with a higher class RI with a higher number of occurrences.

In the MPS scheme context, as mentioned above in the introductory section, the Swap extension is intended to remedy the problem when a member of an RI class, member that has high number of occurrences in the considered IFDS slice, is not part of the extension for reasons such as the subject member is the last in the mathematical order of members. The swap extension will take the member with the lowest number of occurrences, where this member is part of the scheme, and swap it with a member with a higher number of occurrences that is not part of the scheme. The two members that are being swapped are not required to be part of the same RI class, in fact it is preferred from the gain point of view to have the member of higher occurrences that is not part of the scheme as mentioned, of a higher RI class.

The scheme cost consists in specifying the two members in the swap extension. Due to very large range where the two members can exist (there can be for example the second member of class 5 RI being swapped with the third member of class 20 RI), the preferred method to specify the two members is the same or similar method that was described above with reference to the (4+3) method described above.

The scheme net gain is equal to the gain obtained in the MPS scheme with the chain or blanket extension (as applicable) from including the swapped member in the scheme, minus the cost described above. This net gain can be increased by optimizing the scheme cost described above, but these optimizations do not change the substance of the scheme from the point of view of this disclosure.

4 the Fabricate Extension

Similarly as the chain, blanket, or swap extensions, the fabricate extension can be independent, but the focus of the exposition here is in the context of the MPS scheme.

As mentioned above, the situations when the MPS scheme cannot be triggered are limited. For example such situations are (in an IFDS slice, three or more out of five class 4 RI members have an equal number of occurrences AND the rest of the members have a lower number of occurrences) OR (in same IFDS slice, five or more out of ten class 5 RI members have an equal number of occurrences AND the rest of the members have a lower number of occurrences). All these situations, while limited, are problematic because the MPS scheme cannot be triggered because a seed cannot be generated.

There are several solutions to address the above situation:

Adjust the IFDS slice size. For example, if a seed cannot be generated for an IFDS slice of 100 PS, it is very unlikely that such conditions are maintained for a different IFDS slice size such as of 500 PS or 1000 PS.

A zero occurrence RI or AI of lower bit count (such as less than 8 bit, i.e. a class 4, 5, 6, or 7 RI or an AI of an applicable PS class) exists, and is used as a seed.

If none of the above, generate a seed using the Fabricate extension. Note that this Fabricate extension is engaged as a last resort, and such situations when the Fabricate extension needs to be engaged have a low probability.

The extension "fabricates" a zero occurrence RI/AI. An example is provided:

In the current IFDS slice for which MPS scheme cannot be triggered and none of the above alternatives are possible, an RI/AI of class maximum seven where this RI/AI has the lowest number of occurrences, is detected.

For this RI/AI, the fabricate extension is engaged, as follows:

Consider that this RI/AI is a class 6 RI, namely 0100_10

Two seven bit words are created, the first being 0100_10_0 and the second being 0100_10_1

The first seven bit word that is created, 0100_10_0, will represent all the occurrences of the original 0100_10 RI, while the 0100_10_1 will represent the desired seed.

Note that the intrinsic fabricate extension cost consists in one bit penalty for every occurrence of the initial 0100_10 six bit RI (those occurrences were represented by 0100_10, and are now represented by 0100_10_0). That is why the RI/AI with the lowest number of occurrences is detected and chosen. For example, if the chosen RI has six occurrences, the extension cost will be six bits. This cost must be compensated by using the created seed in the MPS scheme, possibly with any of the chain, blanket, or swap extensions.

5 the Exception Extension

The Exception Extension scheme represents a different implementation of the first approach of the non-zero cost approaches described above.

Specifically, in the said first approach, the seed was replacing a high-order RI class belonging to a collection of RI representing high-order RI classes. The cost for the said first approach consisted of the number of bits of the seed plus the number of bits to specify in clear the replaced RI belonging to said collection.

In the exception extension, the replaced RI must be an exception PS, i.e., as defined, a PS that consists of a group of same type bits. In a real-life IFDS, an exception PS may consist in a group of same type bits where the number of such bits is anywhere from 5 to the full size of IFDS. As described, the larger the number of such bits, the lower the probability of occurrence. In FIG. 15, on row 1202, for the convenience, simplicity, and clarity of the exposition in this disclosure, all groups of same type bits larger than 21 are represented by a class 21 PS/RI. This representation is valid theoretically. From this perspective, the exception extension represents a practical implementation or handling of compression for groups of same type bits larger than 21.

Implementation details for the exception extension (EE):
Total cost of the EE consists in external cost and internal cost.
The external cost is considered to be four bits in this example, four bits which describe the compression options (such as MPS with default options, or MPS with blanket extension, or MPS with chain extension, or MPS with exception extension, etc.).
The first internal cost consists of the number of bits of the seed. For example, for a class 4 seed, the cost is four bits. This cost must be counted since the seed replaces the extension PS.
The second internal cost consists of additional four bits representing the PS extension class. For example, the external cost plus the first internal cost equals 8 bits. Adding this second internal cost leads to a total cost for the extension PS of 12 bits. This total cost means that the first exception PS that can be considered as a replaced RI in order to create a minimum net gain of one is a class 13 exception PS (i.e. 13 bits of same type). If the replaced RI represents a class 20 exception PS (20 same type bits), the net gain will be 8. The second internal cost describes what class is the replaced RI, as follows:
Four bits equates to positions 1 to 16
The first 15 positions indicate that the replaced PS is an exception of class 13 to 27, respectively.
Position 16 indicates that the replaced PS is an exception PS of class greater or equal than class 28.
When position 16 is used, the next four bits similarly indicate that the replaced PS is an exception PS of class 28 to 42 (first 16 positions), respectively an exception PS greater or equal to class 43.
Similarly, after position 16, another 4 bits are used to describe exception PS greater or equal to class 43, and so on, the representation cycle repeats as long as necessary to uniquely describe the number of bits in the exception PS.
As described, the net gain of the exception extension can be approximated to a linear increase as a direct function of the exception PS class, this starting with class 13 exception PS. Further optimizations for this gain are possible, such as for example to start with the exception PS of class 11 instead of class 13 (by making the first section of the second internal cost to be 2 bits instead of four when these two bits will represent class 11, 12, 13, and greater or equal to 14). Multiple other optimizations will be apparent to the person skilled in the art.

3 the Mathematical Root Identifier (MRI) Pairing Scheme

The MRI scheme is independent from the MPS scheme, but the two schemes, MPS and MRI, can be used in conjunction, respectively the MRI scheme after the MPS scheme. Using the two schemes in conjunction is the preferred embodiment for this disclosure, since the compression gain from the MPS scheme is compounded with the compression gain from the MRI scheme.

The MRI scheme works the same way if used independent or in conjunction with the MPS scheme. Essentially, if the MPS scheme is not engaged, an IFDS consists of a sequential string of PS. If the MPS scheme is engaged, the IFDS consists also of a string of PS, where in this string of PS, the RI for certain PS have been altered as described for the MPS scheme to produce gain. For example, a seed RI replaced a higher-order RI. Therefore, the main message is that in both cases, the IFDS consists in a sequential string of PS.

As mentioned with respect to FIG. 8, the IFDS string can be further processed by creating two strings, the RI string 813 and the detail string 823, and by pairing every two consecutive RI in the RI string. As described, 35 RI pair classes are formed, from 8 to 42, where each RI pair class has a well defined number of members, from 16 members for class 42 to 1276 members for class 22. The total number of members for all RI pair classes is 21904.

In FIG. 18 and FIG. 19, details concerning the RI pair classes (column 1801), number of members for each RI pair class (column 1802), the probability of occurrence of one member within each class (column 1803), and number of occurrences of all members in one class in 100 RI pairs (column 1804), are shown (100 RI pairs is 200 PS). For example, RI pair class 8 has 25 members, each member has a probability of occurrence of 0.39%, and in an IFDS consisting of 200 PS, respective 100 RI pairs, there are 9.8 (10) members of class 8 showing up. These 10 members are not necessarily individual, but may be more members of same type. All these numbers presented above represent, similar to the discussion for the MPS scheme, nominal distributions and probabilities. Similar to the MPS scheme, all these are subject to a real-life distribution. And similar to the MPS scheme, the embodiments presented for the MRI scheme considers the worst case scenarios.

The MRI scheme comprises the following steps:
Step 1: Alternative Assignment
An alternate assignment of RI pair headers, description and RI root identifiers (RI2) (see FIG. 11 and associated description) is created. This alternate assignment targets to obtain a uniform gain of 2% across a certain number of highest probability RI pair classes. For example, class 9 RI pair has 100 members. As described with reference to FIG. 11, these 100 members are being described using 9 bits. This alternate assignment will have two out of these 100 members to be described using 8 bits instead of 9 bits. Those 2 members that are described using 8 bits will feature a compression gain of 1 per occurrence.

All members of RI pair classes 1 to 15 will be covered by this alternate assignment. All possible assignments are exhausted at class 16. Out of the 964 members of class 16, 774 can be covered by this alternate assignment. These 774 members are of 16 bits each. Since the closest binary prime number to 774 is 512+256, i.e. 768, it means that these 768 16 bit words can be also seen as resources that are being made available for a different step in the MRI scheme. These resources are equivalent to three words of 8 bit each, In addition, the six words of 16 bits that are remaining (774-768) represent six class 16 RI pair configurations of gain 1, when coupled with a next step in the MRI scheme. Therefore, the message here is that the 774 16 bit words can be used as is to partly cover class 16 RI pair, or it can be used as a resource to cover other constructs of the MRI scheme.

It should be noted that RI pair class 8 to 15, covered in step 1 by the said alternate assignment described above, according to the nominal distribution and probabilities, account for 96.88, or 97 occurrences in a 100 RI pair (200 PS) IFDS slice. The other 3 occurrences are at 1.47 of class 16, 0.78 of class 17, 0.41 of class 18, 0.22 of class 19, and 0.24 of class 20-to-42.

Step 2: Seed Generation

Seeds are generated for RI pair class 9, 10, 11, and 12. The process of generating seeds for the MRI scheme is different from the process of generating seeds that was used for the MPS scheme. The process for MRI scheme is exemplified next for class 9 RI pair, and particularities are mentioned for class 10, 11, and 12. All discussions are presented for nominal distribution and probabilities. Note that similarly as presented here for class 9, 10, 11, and 12, seeds can be generated for any other classes, such as for class 8 or 13. Or, generating seeds for classes 9, 10, 11, and 12 may not be necessary, and a version of the MRI scheme can be developed by generating seeds only for classes 9 and 10. The choice for classes 9, 10, 11, 12 is described in the context of this disclosure to exemplify the process.

In the MRI scheme, the typical IFDS slice for the scheme to work optimally is 100 RI pairs, or 200 PS. This IFDS slice size is motivated by the seed generation process that is specific to the MRI scheme, as explained next.

For class 9 RI pair, there are 19.5 (20) occurrences in a 200 PS IFDS slice. Therefore, 20% or less of the class 9 RI pair members are present, with the other 80 members (80%) or more having zero occurrences. The seed generation is based on the unique look-up table correspondence between (Combinations of all class members taken existing members) into (Combinations of all class members taken existing members plus one).

For example, for class 9, in the conditions described above, the unique look-up table correspondence, when 20 members exist or have non-zero occurrences, is between C100_20 and C100_21. Note that this unique look-up table correspondence generates four seeds, and these seeds are unique function of who the 20 members with non-zero occurrences are. The seeds are always members that have zero occurrences, i.e., in this example, the four seeds are 4 of the 80 members that have zero occurrences. Conventionally, the seeds will be number 21, 22, 23, and 24 in term of class 9 members in the subject IFDS slice. These are class 9 seeds, i.e. have nine bits each.

In addition, the seeds are generated only if the group of 20 members do not represent a group of one generated seed by the other 19 members, or 2 seeds generated by the other 18 members, or three seed generated by the other 17 members, and so on. Note that the highest probability is for the group of one seed generated by the other 19 members, probability which is 4/80, i.e. 5%. The other probabilities are much smaller than 1%, therefore, practically, only the highest probability case is considered for this discussion.

The importance of having a large number of members with zero occurrences for this method of generating seeds is apparent at this point, and will be emphasized further in this disclosure. Essentially, as will be shown, the MRI scheme is triggered when "the group of 20 members do not represent a group of one generated seed by the other 19 members" in the context of the above discussion, where the quoted numbers are only for exemplification to simplify the exposition here, and where the basic principle fundamenting the quoted example is expanded to all situations, respectively numbers. Note also the requirement that any group of 20 must generate a group of 4 seeds that produce a unique reconstruction, similar to what has been discussed in detail at the MPS scheme, such as with respect to FIG. 16 and FIG. 17, principle that applied to any seed generation, such as the quoted "seeds generated by the other 19 members". Even further, a unique look-up table such as C100_2 into C100_3 is not preferred for the seed generation in MRI scheme because C100_1 into C100_2 (the equivalent condition to the "the group of 20 members do not represent a group of one generated seed by the other 19 members", would represent a too large percentage that prohibits the trigger of the MRI scheme, extrapolating the basis explained above. Therefore, choosing the applicable classes that meet distribution and probability criteria to generate seeds for the MRI scheme is within a defined range.

Attempting a tractable parallel for the seed generation according to the MRI scheme, FIG. 16 and FIG. 17 are being referred to. Over there, the only situation when seeds according to the MRI method can be generated is when there is one member with non-zero occurrences and the other four members have zero occurrences. A seed according to the MRI method cannot be generated when there are two members or more with non-zero occurrences, because such seed generation will not be unique to insure unique reconstruction, including by the fact that the required equivalent condition to "the group of 20 members do not represent a group of one generated seed by the other 19 members" to insure the scheme trigger is not uniquely possible due to the small numbers of non-zero and zero occurrence members.

Note also that the MRI method of generating seeds is a computational method. The method cannot be memory based, as for the MPS method of generating seeds, and that is because for the MRI method, the memory needs are not practical to be implemented. For example, a memory size of in the order of C100_20 would be needed.

As discussed, using the MRI method of generating seeds is not doable for the MPS method because of the requirement for zero/non-zero occurrence members. The method of generating seeds according to the MRI seeds is not doable for large or too small IFDS slices either, for similar reasons related to the distribution and occurrence of members. At the same time, the reverse, i.e. using the MPS method for generating seeds in the MRI scheme creates notable restrictions for two reasons:

It requires a larger IFDS slice, in order to create a distribution of members within a class (such as in class 8), and that is primarily because for MRI, class 8 RI pair has 25 members with 10 members occurring in 100 RI pair IFDS (versus 5 members in class 4 RI, with 30 members occurring in 100 PS IFDS). Requiring a larger IFDS slice is not a major impediment however, the only notable consequence being that the applications where compression using the MRI scheme can be applied are not applications handling small files, in other words this would only limit the application field.

The larger restriction on using the MPS method for the MRI scheme is related to the cost aspect.

According to the nominal distribution and probabilities, it was shown that 97 out of 100 occurrences in a 100 RI pair (200 PS) IFDS occur in classes 8-to-15. For such an IFDS size, a class 8 seed would create a gross gain on average of about 7-to-8, but the cost would be much larger. Just from specifying the exit RI pair by using a similar to the (4+3) format used for the MPS scheme, the cost would be about 14. This is because for the MRI scheme there are more than 17,000 members that would need to be covered from class 15 to class 42 in order to correctly specify the exit RI pair (similar to the exit RI in the MPS scheme). 17,000 members would require at least 14 bits (therefore cost exceeds the gross gain).

The solution is to have a much larger IFDS, so that classes up to at least 24 (instead of 15) are represented. However, in order to have guaranteed representation of classes up to 24, based on the nominal distribution and probabilities, would require an IFDS of size in the order of 16000 RI pair or 32000 PS, or on average about 640,000 bits. This kind of size would drastically limit the applications, plus the gain to file size ratio would make the compression process slow.

This paragraph demonstrated that the MRI scheme brings embodiments that are not achievable using any other alternative means.

Similar to seed generation for class 9, presented above, seed generation for class 10, 11, and 12 is executed.

For Nominal Distribution and Probabilities:

Eight seeds are generated for class 10, and this is done using the unique link created between C220_22 and C220_23

Sixteen seeds are generated for class 11, and this is done using the unique link created between C370_18 and C370_19.

Thirty-two seeds are generated for class 12, and this is done using the unique link created between C524_13 and C524_14.

The conditions prohibiting the trigger the MRI scheme, when seeds are generated for all classes 9, 10, 11, and 12, are:

For class 9: the group of 20 members do not represent a group of one generated seed by the other 19 members, condition represented by the non-occurrence of the unique link between C100_19 and C100_20, condition that represents about 5% of the possible cases.

For class 10, similarly, the non-occurrence condition is in-between C220_21 and C220_22, which represents about 4% of the possible cases.

For class 11, similarly, the non-occurrence condition is in-between C370_17 and C370_18, which represents about 4.5% of the possible cases.

For class 12, similarly, the non-occurrence condition is in-between C524_12 and C524_13, which represents about 6% of the possible cases.

Adding all the above restrictions forbidding the trigger of the MRI scheme, leads, in the worst case, when the non-trigger restrictions do not overlap for the four classes above, to about 20% non-trigger cases, or 1 in 5 IFDS slices of 200 PS cannot be triggered.

Step 3: Upper Class Coverage

After step 1 and step 2, the following resources are available to cover classes 16 to 42. As shown, after step 1, classes 1-to-15 are fully covered at a gain on 2%. The available resources to cover classes 16 to 42:

774 16 bit configurations of 16 bits or three eight bit seeds (see step 1)
Four class 9 (nine bit) seeds (see step 2)
Eight class 10 (ten bit) seeds (see step 2)
Sixteen class 11. (eleven bit) seeds (see step 2)
Thirty-two class 12 (twelve bit) seeds (see step 2)

The coverage of classes 16-to-42 by these resources, with reference to FIG. 18 and FIG. 19:

Class 16 has 964 members. Class 16 is covered by the 774 16 bit configurations plus one class 9 seed. One class 9 seed is equivalent to 256 configurations of 16 bits. Total: 774+256=1030 configurations of 16 bits. Therefore, 66 of 964 members of class 16, or about 6.5%, generate a gain of 1.

Class 17 has 1028 members. The remaining three class 9 seeds (256*3, or 768 members) plus three of the eight class 10 members (128*3 or 384 members) are used to cover class 17. Total: 768+384=1152, therefore 124 of 1028 members of class 17, or about 11%, generate a gain of 1.

Class 18 has 1084 members. The remaining five class 10 seeds (256*5, or 1280 members) are used to cover class 18, generating about 18% of members to produce a gain of 1.

Similarly, all classes class 19 and greater are covered by the class 11 and class 12 seeds, producing a notable percentage of members with a gain of 1. This process and percentages are not detailed here, sine the fundaments and principles are similar as disclosed above. In fact, class 11 seeds are sufficient to cover all classes 19-to-42 with reasonable percentage gain. Therefore, class 12 seeds can be optionally used to create a distribution for all class 16-to-42 with an even larger percentage gain for all class 16-to-42, or class 12 seeds may not be generated at all for a relatively smaller percentage gain for members of class 16-to-42.

Step 4: MRI Scheme Trigger

As mentioned already above in the discussion at step 3, MRI scheme is triggered when, for all classes that generate seeds (in the example discussed above, for classes 9, 10, 11, and 12), the following condition occurs. A generalization must be discussed here; exemplifications are already provided above.

Each of these classes has a number of naturally occurring members in the considered IFDS slice, as shown above. Be M this number of naturally occurring members for one class, in the considered IFDS slice size. The same class has a total number of members N, out of which (N−M) members have zero occurrences in the considered IFDS slice.

The number of seeds is generated by the unique mathematical relationship created in-between the members by CN_M and CN_(M+1). A number of K seeds are created by this mathematical relationship, where the K seeds are unique as a function of who the M members are, and what is the M value (the N value is a given for the class).

As described above, each class of seeds cover a specific RI pair class. For example, class 9 seeds cover part of class 17 RI pair and class 18 RI pair. A class 17 or class 18 RI pair occurrence may or may not occur in the considered IFDS slice. In fact, according to FIG. 18, in a 100 RI pair IFDS (200 PS IFDS), according to nominal distribution and probabilities, a class 17 or a class 18 RI pair may have 1.3 (1) occurrence.

If a class 17 or a class 18 occurrence is present in the considered IFDS slice, the class 9 seeds are represented. During decompression, M+1 class 9 members are noted in the IFDS, and according to the unique relationship between CN_M and CN_(M+1), it can be uniquely determined which member is the seed, which members are the M naturally occurring members, and which class (class 17 or class 18) and member (of class 17 or class 18) the seed represents, where the member is indicated by the corresponding detail bits of that seed (i.e. the 17-9 or 18-9 bits).

If a class 17 or a class 18 occurrence is not present in the considered IFDS slice, the class 9 seeds are not represented in the considered IFDS. During decompression, M class 9 members are noted in the IFDS slice, and these M members are the naturally occurring members. But the decompression may interpret these M members as a group that consists of one seed member plus (M−1) naturally occurring members. In order to avoid this situation which creates a non-unique decompression path (i.e. the decompression would be compromised), the group of M naturally occurring members must not be formed of seeds generated by sub-groups of those M members plus those sub-groups. For example, a group of M members must not consist of one seed generated by (M−1) members, or two seeds generated by (M−2) members, or three seeds generated by (M−3) members, and so on. As mentioned, the probability that is notable is for one seed generated by (M−1) members, and example values for these probabilities for class 9, 10, 11, and 12 seeds have been provided above, showing that the total probability of non-trigger for the MRI scheme can be around 20% in the worst case, or 1 in 5 IFDS slices of 100 RI pairs will not be triggered.

The non-trigger condition for the MRI scheme can be handled in multiple ways.

If seeds are generated only for classes 9, 10, and 11, the non-trigger probability drops from about 20% worst case, to about 15% worst case, or from 1 in 5 IFDS slices of 100 RI pairs that cannot be triggered, to about 1 in 7 (all in worst case distribution conditions). Clearly, this is a trade-off, because having more seed classes translates in a larger percentage gain, as shown, and this larger percentage gain can compensate for the loss coming from non-triggering of those slices.

To minimize the loss coming from non-triggering slices, an example is provided. A similar example has been already discussed above, in a different context.

Consider the non-trigger percentage is 20%, i.e. class 9, 10, 11, 12 seeds are all considered.

Consider 100 IFDS slices, of 100 RI pair (200 PS) each. That means that 20 such slices are not-triggered, and 80 such slices are triggered by the MRI scheme.

Consider a minimum gain of 2, per slice. To individually indicate the trigger flag for every slice, one bit will be used, with a value of 0 for non-trigger or 1 for trigger. Therefore, the trigger flag cost will be 100. Since 80 slices are triggered to produce gain, the total gain for all 80 slices (which is the same as the total gain for all 100 slices) will be 80*2=160. The net gain for the 100 slices group will be 160−100=60.

If one trigger flag will be used for a group of 2 slices, there will be 50 trigger flags, therefore a total cost of 50. Out of these 50 groups of 2 slices each, in the worst case, 20 will be not-triggered (because one of the two slices will not be triggered) and 30 will be triggered (because both slices can be triggered). Since one slice generates a gain of 2, there will be a gain of 4 for each group of two slices that is triggered, therefore a total gain for the 30 triggered slices of 120. This results in a total net gain of 120−50=70, better than the original 60 obtained in the straightforward allocation.

The 70 net gain is for 100 IFDS slices of 100 RI pair (or 200 PS) each, or 70 for 20,000 PS, or 1 bit for 300 PS, or, on average, 1 bit for 6000 processed bits. This represents a minimal gain provided by the MRI scheme only, minimal gain that reflects that in the derivation of the gain only worst case situations have been considered, and only the gain produced by classes 8-to-15 RI pair has been accounted for.

4 the MPS Scheme for RI2

The fundaments of MPS scheme for RI2 are being disclosed. As described, root identifiers for RI pair (or RI2) are being defined in classes from 3-to-42 (40 classes). As shown, for example, class 8 RI pair is represented by three RI2, one of class 4, one of class 5, and one of class 8.

Each of these 40 RI2 classes is represented by a small number of RI2, or members, where this small number equates to the number of primary binary numbers describing the number of members (see FIG. 18 and FIG. 19, column 1802). For example, for class 8 RI pair, the primary numbers of 25 are 16+8+1, therefore three RI2 will represent class 8, with the configuration as described.

Each of these RI2 has a probability of occurrence that is proportional to the probability of occurrence of a member from the RI pair class of provenance and to the number of RI2 pair members it represents. For example, the class 4 RI2 representing class 8 RI pair has a probability of 0.39*16=6.24%. The class 3 RI2 representing class 10 RI pair has a probability of 0.0976*128=12.49%.

In FIG. 20 and FIG. 21, all this RI2 data is summarized. FIG. 21 is a continuation of FIG. 20, therefore, the comments made with reference to one figure are valid for the other figure as well, unless otherwise noted. In FIG. 20 and FIG. 21, the following RI2 data is detailed:

All RI2 classes are listed in column 2001. Note that there are 36 RI2 classes, from class 3 to class 38. This is an important distinction, since theoretically, as mentioned above, 40 classes would be expected, from class 3 to class 42. The last four classes however, class 39, 40, 41, and 42, have no members in accordance to distribution of primary binary numbers for the member description of RI pair classes.

The number of members for each RI2 class is listed in column 2002. For example, class 5 RI2 has three members, while class 10 RI2 has 7 members. The total number of members, in all 38 RI2 classes, is 151. That is an average of about four members per class.

The probability of occurrence of each member within one class is listed in column 2003. For example, each of the four members of class 4 RI2 has a probability of occurrence of 6.25%.

The content of an IFDS slice of 100 RI2 (200 PS IFDS slice), according to the nominal distribution and probabilities of RI2 classes, is listed in column 2004. For example, the four members of class 4 RI2 will have a total number of occurrences in this 100 RI2 IFDS slice equal to 25.

Given all the above, all the concepts and procedure discussed at the MPS scheme apply here, including the trigger definition and criteria, scheme trigger conditions, seed generation procedure, the extensions, and everything else.

As an example of implementation of the MPS scheme for RI2 is given, in accordance to all concepts as defined for the MPS scheme.

Consider a class 3 RI2 trigger for an IFDS slice size of 200 RI2 (400 PS), size that has been determined to be optimal. A class 3 RI2 seed is therefore generated based on the unique mathematical relationship between C4-1 and C4_2.

A search range for the seed is determined, where the nominal search range for this seed/class is 8. The search range is determined to be 4, leading to a usage efficiency (UE) of 60%.

A chain extension is engaged (default, therefore no cost). According to the UE and the IFDS size, a gross gain of 16 is generated.

The exit RI2 of the chain extension is of class 9, and it is specified in clear using 7 bits. Therefore a seven bit cost is noted.

The overhead cost of the scheme consists in 4 bits for the general header and three bits for the search range, for a total of 7 bits.

The net gain is therefore 16 minus 7 minus 7, equal 2.

The MPS scheme for RI2 can be engaged in four modes:

Following the MPS scheme and the MRI scheme. This is the preferred mode because the compression gain is compounded for all three schemes.

Following the MRI scheme only. In this mode, the MRI scheme gain and the MPS scheme for RI2 gain are compounded.

Following the MPS scheme only. In this mode, the MPS scheme gain and the MPS scheme for RI2 gain are compounded.

MPS scheme for RI2 only, as an independent scheme. In this mode, only the MPS scheme for RI2 gain is counted. This mode may be engaged when for example the MPS scheme, and the MRI scheme, cannot be triggered, for reasons as described.

5 Additional Embodiments

As described across the disclosure, there are practical situations when the MPS scheme, or the MRI scheme, or the MPS for RI2 scheme cannot be triggered. Albeit a low probability event, the worst situation is when none of the three schemes can be triggered at the same time. In this case, the IFDS string is simply transformed (with zero gain and zero loss) through the PS allocation in accordance to the described 29 PS classes (for m=1). The outcome of this transformation is a completely new IFDS format which allows a new compression cycle to be implemented. The cost of this low probability worst situation event is processing time, time in which the three schemes have been tested for triggering in accordance to the possible options and choices, options and choices that have been described across the disclosure.

Before applying this transformation there are a few more options:

Partition the IFDS in different IFDS slice sizes. This option is applicable when the IFDS is still of a considerable size (i.e. more than 1,000 PS). The effect of this alternative IFDS partition in different IFDS size slices is that within each IFDS slice, the distribution and content of that IFDS slice in term of PS, implicitly in term of RI (for the MPS scheme), RI pair (for the MRI scheme), and RI2 (for the MPS for RI2 scheme) changes, and with this new distribution and content very likely at least one if not all three schemes will trigger and gain will be produced.

Another option, particularly useful for very small IFDS (between 100 PS and 1,000 PS) is to change variable m. There are several very significant applications that deal with such small IFDS in the latest stages of compression, such as an audio codec application. By changing the value of m, all allocations discussed across this disclosure for m=1 change, including the number of PS families and PS classes, the RI, RI pair, and RI2 groups, members, and classes, the mathematical relationships to generate triggers and seeds, the number of triggers and seeds, etc. In order to be able to implement this option, the required ROM content memories, the procedures to calculate certain seeds, as described, are required to be available in the hardware or software implementation, as the case implementation is. Having this option for applications that handle such very small IFDS, such as for an audio codec is highly desirable and recommended.

As discussed across this disclosure, the procedure to generate triggers for the MPS scheme, or the procedure to generate seeds for the MPS scheme or for the MRI scheme considered member distribution and content within one singe class. This is in no way limiting for this disclosure, and similar procedures to generate triggers and seeds based on the distribution and content across multiple classes is possible. For example, the MRI seeds can be generated for in class 5 RI pair class using the content and distribution of class 4 RI pair class. This type of cross-class seed generation can be employed to overcome a trigger condition that prevents the scheme from being triggered, as explained in the disclosure. For this cross-class seed generation scheme, the non-trigger condition will be tested for class 5 instead of for regular class 4. An additional small cost will be incurred by employing such a cross-class seed generation (the cost will be in the main header, to indicate a version for example with cross-class seed generation for MRI scheme), but that would be a small cost that is fully motivated by having a triggered scheme, which otherwise would not be possible.

As disclosed, pairs of two consecutive PS, leading to RI pairs and RI2 pairs have been used to create gain. As mentioned, groups of three, four, five, or any number of consecutive PS can be employed using similar considerations as described for pairs. The impact of using this superior grouping consists in the fact that a larger number of classes, and members within each class are created. For example, using groups of four consecutive PS, quadruples of four RI are created, with classes between 16 and 84. Class 16 will have 5*5*5*5 (625) members, and the number of members increase substantially for upper classes. The main implication for the BCD method is that for an MRI equivalent method applied for this type of grouping, the distribution of occurring members in an IFDS slice is wide, i.e. only a small number of members will have non-zero occurrences within the member possibilities within one class. For example, for class 16, calculating the nominal probabilities, one member out of 625 members may occur (may, because the probability is smaller than one in a 400 PS slice). That translates is that the 100 quadruples that will occur in the 400 PS slice is pseudo-random, with obviously higher probabilities for lower-order classes. This small and pseudo-random coverage of members in an IFDS slice makes the non-trigger probability very small, the seed generation very wide and with multiple member options, and the reallocation for gain very efficient. The price however is complexity and computational time penalty, making such an implementation to generate compression gain at a slower speed.

For the MRI scheme, reallocation for gain of a percentage of members within an RI pair class has been disclosed. For classes 8 to 15, the percentage of target members was presented to be 2%, and for classes 16 to 42, that percentage was larger. This reassignment can be modified within a certain range to obtain a different percentage gain. For example, a percentage gain of 3% can be achieved for classes 8 to 14 (note that the upper class of this range was 15 before), with the cost of having more upper classes required to generate seeds (for example classes 9, 10, 11, 12, 13 instead of 9, 10, 11 and 12). The cost consists in more complexity, more computational time, slower compression, and higher non-trigger condition percentage. The benefit is a larger compression gain. A percentage larger than 4% for the high probability classes is not convenient because the upper class for these classes needs to be reduced even further, and then coverage capability for the upper classes becomes very difficult. Reducing the percentage gain to 1% instead would increase the upper class level to class 17 (8 to 17), would reduce the number of upper classes to generate seeds (therefore reduce the non-trigger percentage and complexity, including the computational time), but obviously will reduce the gain. Creating a different distribution of classes and members within a class (such as by increasing variable m, or by creating different grouping instead of pairs (as discussed above) will open up different avenues for this.

The seed generation disclosed for the MPS scheme, the seed generation disclosed for the MRI scheme, the seed generation disclosed for the MPS for RI2 scheme, and the seed usage disclosed for the MPS, MRI, and MPS for RI2 schemes, represent additional embodiments for a data encryption/decryption procedure or method. While these embodiments disclosed here can be used for any consumer application, the preferred use is for high security applications, including military. A description of these embodiments is as follows:

For the seed generation for the MPS scheme, consider the following example. As described, trigger generation conforms to criteria such as c.a., applied to class 4 RI, where the unique look-up table used to generate the seed (C5-1 to C5-2 link of FIG. 16) can have C4-2 versions (there are two seeds possible per one trigger in a space of four seeds). This represents an encryption space, MPS_seed, and one encryption key.

For the seed generation for the MRI scheme, consider the following example. As described, consider the case where seeds are generated for class 9, 10, 11, and 12 RI pair. For the seed generation within class 9 RI pair for an IFDS slice of 200 PS, there are 20 nominal occurrences of a class 9 RI, and the seed conforms to the unique link C100_20 to C100_21, unique link which will have C80-4 versions. Similarly, according to the data and description provided in this disclosure, encryption spaces for class 10, class 11, and class 12, with nominal versions respectively of C198_8 (for class 10), C351_16 (for class 11) and C511_32 (for class 12) are defined. This represents therefore four encryption spaces, respectively MRI_seed_c9, MRI_seed_c10, MRI_ssed_c11, and MRI_seed_c12, and four encryption keys. These encryption spaces are very large, but note that these spaces take effect only when the respective seeds are used, or represented, as described in this disclosure (for example, as discussed, a class 9 seed is represented if a 17 or a class 18 occurrence is present in the considered IFDS slice).

For the seed generation for the MPS for RI2 scheme, consider the following example. As described, trigger generation conforms to criteria such as c.a., applied to class 3 RI2, where the unique look-up table used to generate the seed is the C4-1 to C4-2 link, where this unique link can have three versions, one for each of the three members that the seed can be generated for. This represents an encryption space, MPS_RI2_seed, and one encryption key.

As mentioned, for MPS and MPS for RI2 schemes, the seed usage consists in replacing a member of a higher order class, where this replacing process can be a single event as in the exception extension, a chain event as in the chain extension, or other, as disclosed. The member to be replaced is chosen based on a specific criteria, as disclosed—for example, the member to be replaced can be the first member considered in mathematical order, within a higher order class, that has non-zero occurrences in the respective IFDS slice. Similar other criteria can be formulated (for example, the member to be replaced is the second member considered in mathematical order within a higher order class that has non-zero occurrences in the respective IFDS slice). The number of such defined criteria within one higher order class represents an encryption space usage_class, with the number of such spaces equal to the number of higher order classes. The number of such spaces represent the number of encryption keys for this type of encryption. Such spaces and encryption keys apply for both MPS and MPS for RI2 schemes, and both such spaces and keys exist when the higher order class corresponding to the respective space and key exists (i.e. is used by means of a replaced member).

For the MRI scheme, as described, the compression gain is achieved by reassignment of high probability classes (such as class 8 to 15 RI pair classes in one of the examples presented) and in seed-driven reassignment of the rest of the classes (such as 16 to 42). In such reassignments, within every class, certain members (such as 2% of the total members) will produce a gain of 1. The encryption here consists in implementing permutations of the members that will produce gain within every class. The encryption space achieved with this technique, for one and every class, depends on the number of members within that class. For example, for class 9 RI pair class, class that has 100 members, the reassignment will imply that 2 members will produce a gain of 1. The encryption space for this class, in the conditions of 2% gain, will be C100_2. Since there are 35 classes (8 to 42), there will be 35 such encryption spaces and 35 independent encryption keys.

Multiple possibilities exist, that may include similar variations to what has been disclosed above, or combinations and refinements of those. All these possibilities and variations do not alter in any way the substance and claims of this disclosure.

6 Hardware and Software Implementation Considerations of the BCD Method

As mentioned, the implementation of the BCD method may typically engage the following seven possibilities of orderly sequence of schemes:
Case 1: MPS, MRI, MPS for RI2
Case 2: MPS, MRI.
Case 3: MPS, MPS for RI2.
Case 4: MRI, MPS for RI2
Case 5: MPS
Case 6: MRI
Case 7: MPS for RI2.

Figure 22:
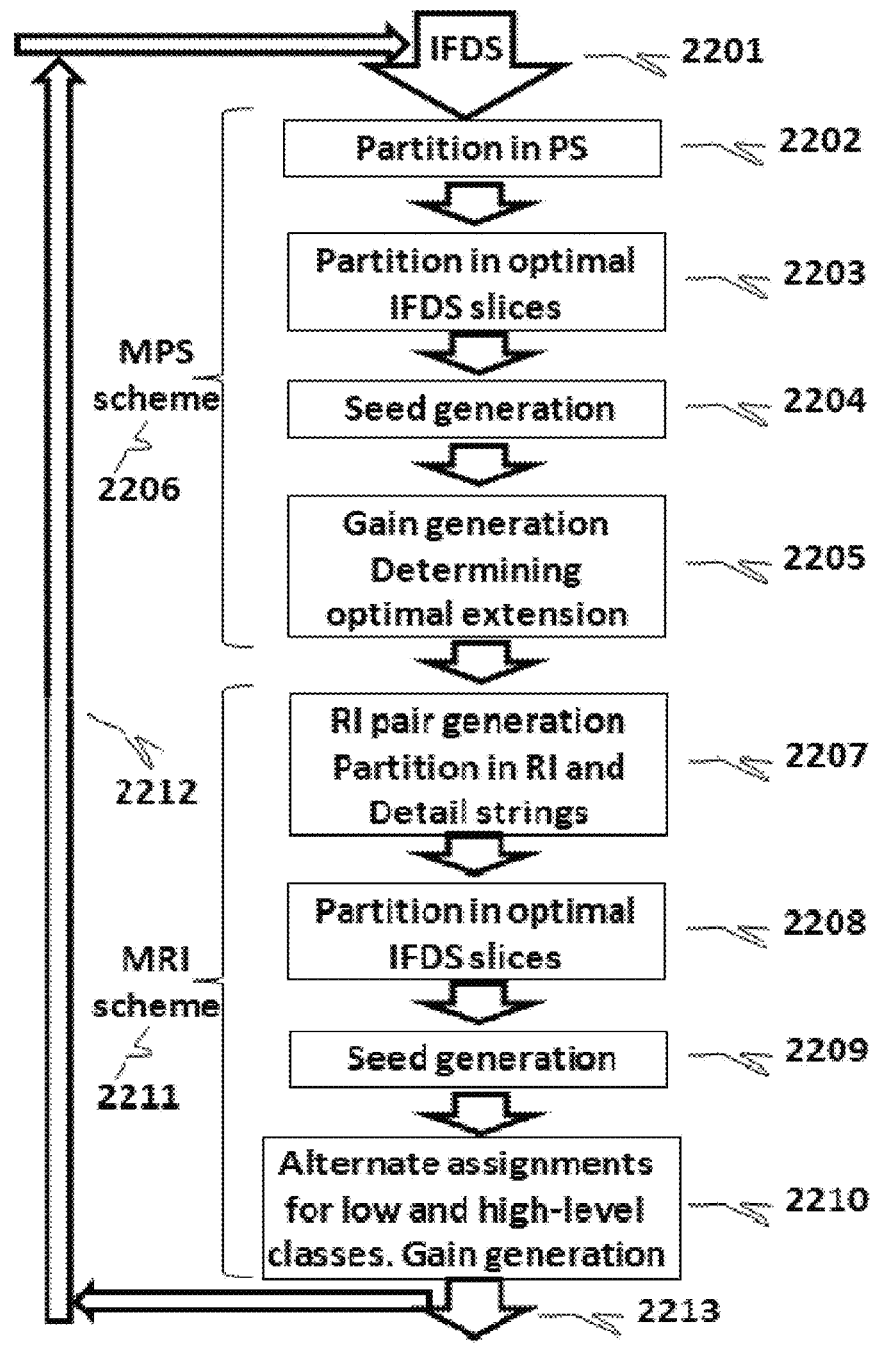
FIG. 22 is used to introduce, describe, and illustrate the flow and implementation of the compression process in term of operations and blocks of focused operations, all in accordance to one or more of the embodiments.
Figure 23:
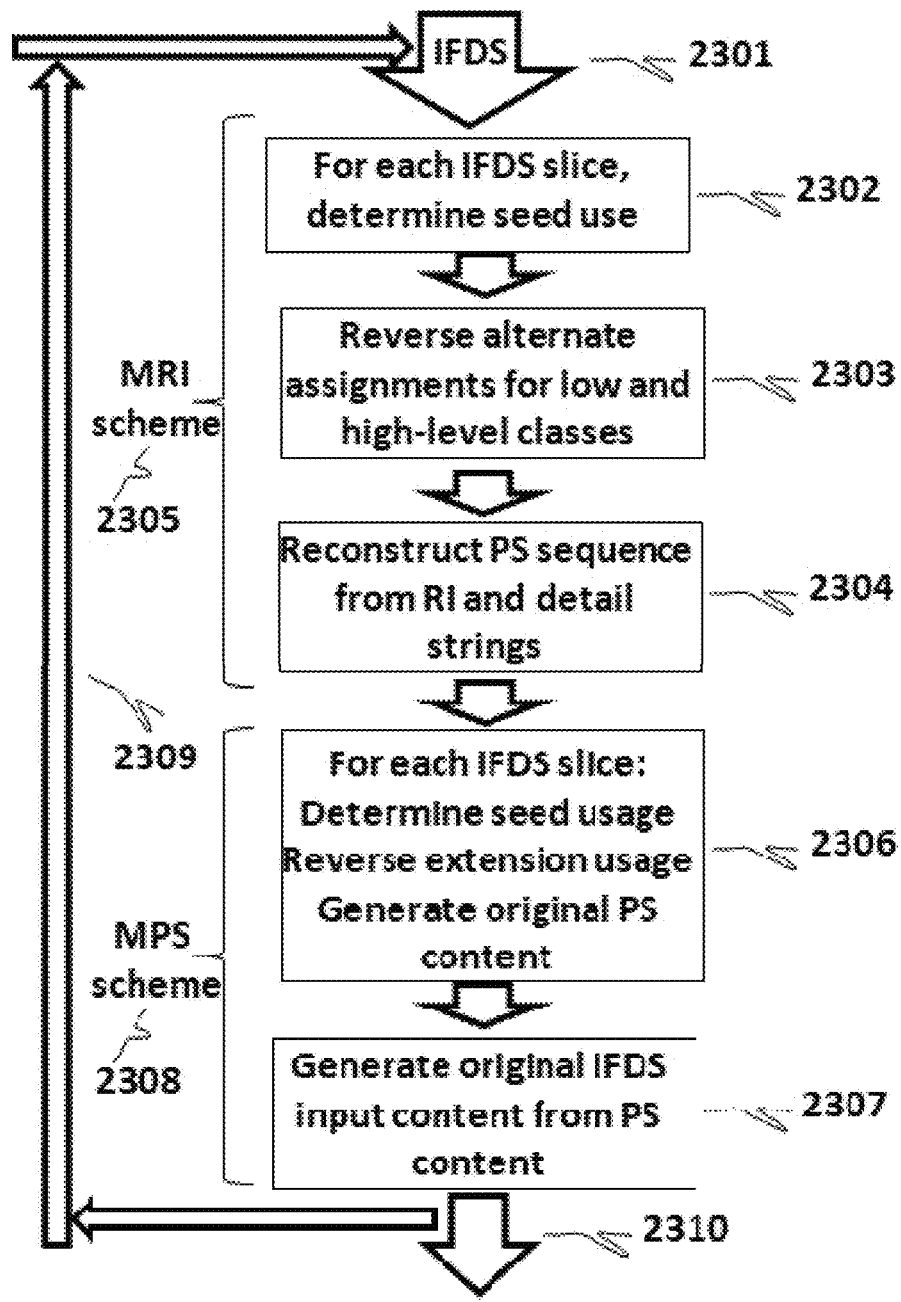
FIG. 23 is used to introduce, describe, and illustrate the flow and implementation of the decompression process in term of operations and blocks of focused operations, all in accordance to one or more of the embodiments.

The implementation of the BCD method for Case 2 (MPS, MRI) is being presented next for compression (FIG. 22) respectively decompression (FIG. 23). Case 2 has been chosen since it is the most representative in diversity while is the most simple to follow.

The compression respectively decompression process is presented in FIG. 22 and FIG. 23 in term of block-level diagrams, where each block contains specific operations for the respective scheme, operations that have been disclosed, detailed, and exemplified above. The said block-level diagrams apply for both software and hardware implementations. As mentioned, the operations in each of the blocks referred to in FIG. 22 and FIG. 23 have been detailed in the disclosure, and will not be revisited during the description below.

For the compression process, with reference to FIG. 22, the following is noted:

The uncompressed IFDS is received at the input at 2201.

The compression process starts with the implementation of the MPS scheme. In FIG. 22, this is indicated by the group of blocks 2206, group of blocks that contain blocks 2202, 2203, 2204, and 2205.

The received uncompressed data is partitioned in input PS, which input PS are then transformed in corresponding output PS. These operations occur in block 2202.

Optimal size IFDS slices are created in block 2203. Content of these IFDS slices is determined in block 2203 as well.

The seed generation according to the MPS scheme, together with the derivation of the optimal search range, are implemented in block 2204.

The extension that achieves the optimal gain, together with the gain generation implementation in accordance to that extension, are determined respectively engaged in block 2205.

Once the implementation of the MPS scheme completes, the resulting string is then compressed using the MRI scheme. In FIG. 22, this is indicated by the group of blocks 2211, consisting of blocks 2207, 2208, 2209, and 2210.

The compressed string from the MPS scheme is formatted in the two constituent strings, the RI string and the detail string. The RI string creates the RI pairs. These RI pairs are transformed using the RI pair standard assignment. All these operations are performed in block 2207.

The RI string, with the formed RI pairs, as received from block 2207, is partitioned in optimal IFDS slices, in block 2208. The content of each slice, in term of RI pair class, is determined in this block as well.

The seed generation for each IFDS slice determined and processed in block 2208, seed generation that is done according to the MRI seed generation method, is performed in block 2209.

The alternate assignments for gain, for low classes (8 to 15) and for high classes (16 to 42), are implemented in block 2210.

The compressed data after the MPS and MRI scheme is either returned to the input across path 2212 for an additional compression cycle, or is sent to the output for the intended use of the compressed data across path 2213.

For the decompression process, the following is noted with reference to FIG. 23:

The compressed IFDS is received at the input at 2301.

The decompression process is a mirror of the compression process. Therefore, the decompression process starts with the last operation of the compression process, the MRI scheme. In FIG. 23, this is indicated by the group of blocks 2305, group of blocks that contain blocks 2302, 2303, and 2304.

The content of each IFDS slice in the received compressed data is derived, and then the seed use in that slice is determined. The seed use is according to the MRI scheme. All these operations are implemented in block 2302.

The alternate assignments for the RI pairs in the RI string for low classes (8 to 15) and high classes (16 to 42) are reversed to the standard RI pair assignments. All these operations are performed in block 2303.

Once the standard RI pair assignments are created, the PS content can be reconstructed from the RI string and the detail string. These reconstruct operations are implemented in block 2304.

After block 2304, the MRI scheme is completely reversed, and the PS string that is being obtained represents the compressed data that was obtained from the MPS scheme. This compressed data from the MPS scheme needs to be decompressed. This is done in the groups of blocks 2308, comprising blocks 2306 and 2307.

In block 2306, the content of each IFDS slice from the received PS string from block 2304 is derived, and then seed use in that slice is according to the MPS scheme is determined. Then, the data is decompressed in accordance to the extension that has been used at compression. After this, the original PS content can be derived.

From the original PS content derived at block 2306, the original input IFDS is being derived in block 2307.

The decompressed output data from block 2307 is either sent back to the input 2301 through path 2309 if additional decompression cycles are indicated, or is sent to the final 2310 output for the usage of the decompressed data in the desired application.

In term of execution speed of the compression and decompression processes for the seven cases in which the BCD method may be implemented, all cases containing the MRI scheme are slower, since the MRI scheme involves a complex computational-based process to generate the seeds, as described.

In term of which of the three schemes can compress the smallest IFDS slice, the MRI scheme is the optimal scheme. The MRI scheme can compress an IFDS slice of 200 PS and even less. The advantage of the MRI scheme from this point of view, as compared to the MPS scheme and MPS scheme for RI2, comes from the fact that the MRI scheme has the lowest intrinsic cost. The most notable cost advantages for the MRI scheme are that the MRI scheme does not need a cost to specify a search range, and does not incur a cost to specify an exit element (such as an exit RI for the MPS scheme). Being able to compress a small IFDS slice is a requirement for certain applications represented by small bit streams.

The range of applications for the BCD method covers practically anything, from digital communication, to data storage, to digital streaming, to networking aspects. For example, from sharing a movie compressed into a 1 Mbit file, to resolving network capacity issues, to addressing storage capacity limitations, to internet and social media applications. As mentioned, certain applications are favoured by a software-based implementation of the BCD method, while other applications are favoured by a hardware-based implementation of the BCD method.

The most challenging applications are live communication applications and applications handling small streams of data. For example:

A live high definition (up to raw) video communication application may require multiple parallel compression streams implemented by multiple parallel operating compression/decompression chips.

A full-band audio codec for applications such as for cell-phone communication, will require a customized BCD method where the audio steam is divided in IFDS slices to implement the required data latency and where each IFDS slice is then compressed using initially the full BCD method, and then as the IFDS size slice is successively reduced in size in accordance to the applied compression cycles, the BCD method employs compression schemes that can compress small IFDS size binary streams, such as the MRI scheme.

For example, if the original audio stream is 20 Hz-20 KHz, and is sampled using a 12 bit Analog-to-Digital converter (ADC), the minimum total stream size per second is 500K bits. To implement a 50 ms latency, this data stream is broken into 20 sequential IFDS slices of 25K bits each. Each of these IFDS slices is compressed by the BCD scheme down to 4K bits (about 200 PS) and transmitted across the communication channel. At the receiver, the compressed IFDS slices are sequentially decompressed, and the decompressed slices are assembled in the same original order obtaining the original full-band audio stream.

From reading the present disclosure, other variations and modifications will be apparent to the skilled person. Such variations and modifications may involve equivalent and other features which are already known in the art or are implied by the embodiments presented in this disclosure. Such variations and modifications may increase the performance of the BCD method, such as may increase the compression/decompression efficiency or speed.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A method to uniquely and reversibly compress any arbitrary binary input data string, (IFDS) without any data loss, comprising:
    developing a set of root identifiers (RI), comprising:
        each of said RI is assigned a unique original representation comprising a probability and a number of bits of unique configuration;
        said set does not change as a function of sequence of bits of said IFDS, and said IFDS, of a first size in term of number of bits greater than a minimum size, is fully described using said set of RI, with said RI that occur in said described IFDS, creating a content of RI for said described IFDS;
    tabulating said content of said described IFDS in term of said RI, wherein said tabulation comprising the number of times each of said RI occurs, and such creating a distribution for said set of RI, with an occurring RI being a member of said IFDS;
    singling out one or more of said RI, called seeds, based on mathematical and relational operations between characteristics of said RI that belong or not to said content of said described IFDS, wherein said mathematical and relational operations comprising comparisons, additions, subtractions, combinations, distributions, permutations, and said characteristics comprising said number of bits, said probability, said unique sequence, said distribution;
    compressing said described IFDS is by employing a combination comprising said tabulated content and said seeds, in one or more of:
        altering said original representation of one or more of said RI by assigning a smaller of said number of bits or by changing said unique sequence to a unique sequence which is derived from a said seed, wherein said RI that have said original representation altered are selected based on said characteristics;
        replacing a first said member by a said seed or by a second said member every time said first member occurs in said described IFDS, wherein said first member has a larger said number of bits than the number of bits of said seed or of said second member
    generating an output file of a second size in term of number of bits for said compressed IFDS, with said compression gain being generated when said second size is smaller than said first size;
    uniquely reversing said compression by generating said IFDS from said output file, i.e. decompressing said output file;
    wherein said compression and decompression are both implemented either in hardware or in software using hardware blocks or respectively software modules of specific functionality for every step of said method.

2. A procedure to repeatedly apply the method of claim 1, comprising:
    completing a said compression cycle by generating said output file;
    said describing said output file as a new said IFDS and such initiating a new said compression cycle called a repeated compression cycle; and
    performing a variable number of said repeated compression cycles wherein said variable number is determined as a function of reaching a target size for said output file.

3. The method of claim 1 implementing compression using slices, comprising:
    said described IFDS is partitioned in multiple slices, wherein each of said slices is assigned an order number in ascending order representing the order in which a said slice is positioned in said described IFDS;
    each of said slices is being independently compressed using said method, wherein a compressed output for said slice that is preserving said order number is generated; and
    said compressed output of each of slice is put together in an output file for said described IFDS according to said order number of each said respective slice.

4. A procedure to encrypt said output file of claim 1, comprising:
- generating an encryption space together with a corresponding encryption key for a third said RI of a role in said method and of a first said characteristic, using one or more said mathematical and relational operations applied among said RI that have a same said first characteristic, with said role comprising a said seed, or a said member, or a said RI with said altered representation;
- generating a total encryption space which is defined as comprising a combination of one or more of said encryption spaces wherein each of said encryption spaces corresponds to one of said third RI of a different said characteristic;
- generating a global encryption key which is defined as comprising a combination of one or more of said encryption keys wherein each of said encryption keys corresponds to one of said third RI of a different said first characteristic; and
- wherein said IFDS may be compressed at the same time with being encrypted, or may be encrypted only, wherein said IFDS is only encrypted when said output file represents only said described IFDS with said third RI characteristic and role still determined.

5. The procedure of claim 4, further concealing that a file is encrypted, comprising:
- said global encryption key is of a third size in term of number of bits, with said third size defining encryption strength by having a larger said third size for a stronger of said encryption strength;
- said compression gain is defined in term of a first number of bits equal to said first size minus said second size, with a stronger compression gain meaning a larger said first number;
- in order to conceal that a file is encrypted, said first number must be greater or equal than said third size, with a said stronger encryption strength being concealed by a stronger compression.

6. An application designed for a hardware implementation of a compression/decompression process, capable to compress/decompress any arbitrary input data string (IFDS) without any data loss, comprising:
- a first group of digital blocks of specific functionality comprising:
  - receiving said IFDS of a first size in term of number of bits that is greater than a minimum size, and fully and uniquely describing said IFDS using a stored reference data structure comprising:
    - a) a set of processing strings (PS), organized in a set of a limited number of PS classes, wherein:
      - said IFDS is uniquely partitioned using said set of PS that does not change as a function of sequence of bits in a said IFDS;
      - each said PS class comprising a finite number of said PS with no two said PS classes having said PS of a same number of bits;
      - a number of unique root identifiers (RI) are developed for every said PS class, creating, out of all said PS classes, a set of primary RI which uniquely transforms said IFDS with said transformation maintaining same said first size for said IFDS;
    - b) said set of primary RI wherein:
      - each of said RI is assigned an original representation comprising a number of bits of a unique sequence and a probability
      - said set of primary RI does not change as a function of sequence of bits in a said IFDS;
      - said set of primary RI is organized in a number of RI classes comprising a finite number of said RI with
        - no two said RI classes having said RI of same number of bits;
    - c) a set of RI derivates wherein;
      - said set of RI derivates comprising either said set of primary RI, or a set of RI pairs, or a set of multiple RI, or a set of RI2, wherein said set of multiple RI is a set as either triplets, quadruplets, or other higher order combinations of said RI, and said set of RI2 is a set that uniquely describes said set of RI pairs;
      - every said RI derivate is assigned an original representation comprising a number of bits of a unique sequence and a probability, all with an equivalent meaning as defined for said RI;
      - said set of RI derivates is organized in a number of classes comprising either said RI classes, or RI pair classes, or multiple RI classes, or RI2 classes, each class comprising a finite number of said RI derivates, with no two said classes having said RI derivates of same number of bits;
  - creating a database comprising content and distribution of said RI derivates that occur in said described IFDS one or more times, wherein said occurring, RI derivates are called members;
  - singling out a number greater or equal to one of said RI derivates, known as seeds, by
    - one or more mathematical and relational operations involving characteristics of a specific number greater or equal to one of said members, known as triggers;
      - wherein said mathematical and relational operations comprising one or more of comparisons, additions, subtractions, combinations, distributions, permutations, and said characteristics comprising one or more of said number of bits, said probability, said unique sequence, said distribution;
- a second group of digital blocks of specific functionality comprising:
  - processing said database by employing said seeds, said triggers, and one or more first techniques in order to generate compression gain, wherein a said first technique comprising one or more said mathematical and relational and operations between said characteristics of said seeds, said triggers, and said members;
  - a said first technique generates an output file of a second size in term of number of bits and such completing a compression cycle, wherein said compression gain is generated when said second size is smaller than said first size;
- digital blocks of dual, reverse functionality to said digital blocks in said groups of digital blocks, uniquely reversing said compression process by generating said IFDS from said output file, i.e. decompressing said output file; and
- for all said digital blocks, when said functionality is emulated into a software-based equivalent functionality, lead to an application designed for a software implementation instead of said application designed for a hardware implementation.

7. A said first technique of claim 6, comprising:
a first said seed is used to replace a first said member known as replaced RI, wherein:
said first IBC has a first said number of bits;
said first member has a second said number of bits and occurs in said described IFDS a third number of times, with said second number greater than said first number;
said compression gain, generated by said first technique, comprising:
said second number minus said first number represents said compression gain per each of said third number occurrences;
said first member is uniquely identified and written in said output file as a fourth number of bits.

8. Said first technique of claim 7, wherein conditions for said first seed to replace said first member further comprising:
said first member occurs within a search range in said described IFDS, wherein said search range is a number of consecutive of said members which starts with a said first seed, and ends with a said member;
if within said search range said first seed naturally occurs, such occurrences are called outliers; and
an outlier is differentiated from said first seed that replaces said first member, wherein said differentiated comprising providing a different identity to said outlier than to said first seed that replaces said first member.

9. Optimizing said search range of claim 6, comprising:
said number of times that said outliers occur within said search range is optimized towards a minimum;
the size of said search range divided by the size of said described IFDS is optimized towards a maximum, wherein said size of the search range is said number of consecutive members and said size of said described IFDS is the number of said members in said content of said described IFDS;
wherein all said optimizations are concurrent.

10. Said first technique of claim 8 wherein said outlier is said differentiated from said first seed that replaces said first member by using a sequence of steps, comprising:
providing said different identity for said outlier is achieved by adding to said first seed a unique suffix comprising a unique combination of one or more bits;
providing said different identity for said first seed that replaces said first member is achieved by adding to said first seed another unique suffix that has the same number of bits as said unique suffix, and wherein said another unique suffix comprising another unique combination of said one or more bits.

11. Said first technique of claim 7 wherein said first member that is replaced by said first seed is identified using a combination of one or more approaches, comprising:
said first member is identified in a mathematical order, among said members of a said second number of bits as said first member;
said first member is identified based on a said characteristic of said first member, comprising said having largest number of bits or occurring largest number of times in said described IFDS;
said first member is identified based on one or more special cases, comprising a first special case known as "seed-related replaced RI" defining a group of members having same number of bits that follow a said unique sequence of any said number of bits, or a second special case known as "pre-defined RI" wherein said pre-defined RI is default for said first member.

12. A said first technique of claim 6, called chain extension, comprising:
a link is defined when a first said member of a first said number of bits, called replaced member, is replaced by a second said member of a second said number of bits, called generated member, wherein said first number is a next larger number to said second number, with said first number being of a member that is not a said replaced member used for another said link, and wherein said first member occurs a third number of times in said described IFDS;
a chain of successive of said links is defined as when a first link is between a third member and a fourth member, said successive second link must include said fourth member, i.e. said second link is between said fourth member and a fifth said member;
a first said seed is used to generate a said chain, called regular chain, wherein a said link in said regular chain contains a sixth member that has the largest number of bits in said described IFDS as a said replaced member;
said compression gain, generated by said chain extension, comprising:
said compression gain for each of said links in said regular chain comprising said first number minus said second number per each of said third number of occurrences;
said sixth member is uniquely identified and written in said output file as a fourth number of bits.

13. Said first technique of claim 12, recalled swap extension, further comprising:
a seventh said member of a fifth said number of bits, which is part of said regular chain;
an eighth said member of a sixth said number of bits that is not part of said regular chain, with said sixth number greater than said fifth number, and occurring a seventh number of times in said described IFDS;
said seventh member and said eighth member create a custom said link, and another said link is created between said eighth member as said generated member and a ninth member in said regular chain as said replaced member that is characterized by an eighth said number of bits and occurs a ninth number of times in said described IFDS;
a custom said chain is created comprising one or more of said links in said regular chain, said custom link, and said another link;
said eighth member swaps one or more said members that are part of said regular chain and not of said custom chain, wherein said one or more members have said number of bits larger than said fifth number and smaller than said eighth number;
said compression gain, generated by said swap extension, comprising:
said compression gain for each of said links in said regular chain that belong to said custom chain, comprising said second number minus said first number per each of said third number of occurrences;
said sixth member is uniquely identified and written in said output file as a fourth number of bits;
said compression gain for said custom link comprising said sixth number minus said fifth number for each of said seventh number of occurrences;

said compression gain for said another link comprising said eighth number minus said sixth number for each of said ninth number of occurrences;

said eighth member is uniquely identified and written in said output file as n tenth number of bits.

14. A said first technique of claim 6, called blanket extension, comprising:
a blanket step is defined when a first said seed of a first said number of bits and of a first said unique sequence is transformed into a first higher order seed comprising said first unique sequence followed by a logic 0 bit and a second higher order seed comprising of said first unique sequence followed by a logic 1 bit;
a blanket is defined as to when for two consecutive said blanket steps, a current blanket step and a next blanket step, a said higher order seed from said current blanket step is said transformed by said next blanket step into a said first higher order seed and a said second higher order seed, with said blanket ending with a said next blanket step wherein said first higher order seed has a number of bits equal to said number of bits of a said member of largest number of bits in said described IFDS minus one;
a blanket of seeds is defined as said first higher order seeds of each said blanket step in said blanket;
a link is defined when a first said member of a second said number of bits, called replaced member, is replaced by a second said member or a said first higher order seed of a third said number of bits, called generated member, wherein said second number is a next larger number to said third number, with said second number being of a member that is not a said replaced member used for another said link, and wherein said first member occurs a fourth number of times in said described IFDS;
a chain of successive of said links is defined as when a first link is between a third member and a fourth member, said successive second link must include said fourth member, i.e. said second link replacement is between said fourth member and a fifth said member;
a first said blanket of seeds, generated by a said seed;
each of said first higher order seeds in said first blanket of seeds may generate a said chain, wherein:
no two said chains have a common said member;
said "may generate" refers to the situation when a said first higher order seed will not generate a said chain because all said members are already part of said chains generated for other said first higher order seeds;
there is a said link in each said chain—that contains a said member that has the largest number of bits that is still available in said described IFDS, wherein said still available means that said member is not already part of said chains generated for other said first higher order seeds;
said compression gain, generated by said blanket extension, comprising:
said compression gain for each of said link in each of said chains, comprising said second number minus said third number per each of said fourth number of occurrences;
for each of said chains, said member with said largest number of bits that is still available in said described IFDS is uniquely identified and written as a seventh number of bits in said output file.

15. A said first technique of claim 6, called MRI scheme with alternate assignment comprising:
said set of RI derivates, comprising a first number of said RI derivates;
said set of RI derivates is organized in three partitions, a first partition of a second number of RI derivates, a second partition of a third number of RI derivates, and a third partition of a fourth number of RI derivates, wherein said first partition preserve said original representation, said second partition alter said original representation by having assigned to said third number of RI derivates a smaller said number of bits than in said original representation, and said third partition alter said original representation by having assigned to said fourth number of RI derivates a different said unique sequence of bits;
said probability is organized in three intervals, average, high, and low, with said first partition having said average probability, said second partition having said high probability, and said third partition having said low probability; and
said compression gain is created every time a said RI derivate of said second partition occurs in said described IFDS.

16. Said first technique of claim 15 recalled MRI scheme with upper class coverage, comprising:
a first said mathematical and relational operation is applied to a fifth number of said members of a sixth number of bits to uniquely single out a seventh number of said RI derivates of said sixth number of bits called first seeds wherein said first seeds do not occur in said described IFDS;
wherein said fifth number of members must not represent an eighth number of said first seeds plus a ninth number of said members, wherein said ninth number uniquely singles out said eighth number through a mathematical first operation;
said third partition comprising a tenth number of said RI derivates of an eleventh number of bits, with said sixth number minus said eleventh number greater than zero and equal to a twelfth number of bits;
said unique sequence of bits of a said first seed followed by said twelfth number of bits create a thirteenth number of alternate unique sequences; and
when said thirteenth number is equal to said tenth number, no said compression gain is produced, and if said thirteenth number is greater than said tenth number, compression gain is produced for every occurrence in said described IFDS of one of gain alternate unique sequences defined as said thirteenth number minus said tenth number.

17. A combination of one or more of said first techniques of claim 6, comprising:
a) a first said first technique comprising:
a first said mathematical and relational operation, wherein:
said first operation uniquely singles out a first number of RI derivates of a second said number of bits, wherein
said first number is greater or equal to one, and wherein said singled out derivates are called first triggers;
a second said mathematical and relational operation, wherein:
said second operation uniquely associates said first triggers to a third number of RI derivates of said second number of bits, wherein said third number of RI derivates are said seeds and are called first seeds;

wherein either a said first seed or a said first trigger is used to replace a first member known as replaced member of a fourth number of bits, wherein said fourth number is greater than said second number; and wherein said fourth number minus said second number represents said compression gain per each time said another first member occurs in said described IFDS;

b) a second said first technique, known as MRI scheme with alternate assignment, comprising:
  said set of RI derivates comprising a sixth number of said RI derivates;
  each of said RI derivates have said probability in a range defined as high, average, or low probability;
  a first partition of said set of RI derivates, comprising a seventh number of said derivates, high probability, and of said original representation that is altered, by being assigned a smaller number of bits to said unique sequence than in said original representation;
  wherein every time a said derivate belonging to said first partition occurs in said described IFDS, said compression gain equals to the number of bits of said string derivate when it is represented by said original representation minus said number of bits when it is represented by said first partition;

c) a third said first technique, known as MRI scheme with upper class coverage, comprising:
  a third said relationship and relational operation wherein:
    said third operation is applied to an eighth number of said members of a said ninth said number of bits to uniquely single out a tenth number of said RI derivates of said ninth number of bits called second seeds wherein said second seeds do not occur in said described IFDS and;
    said tenth number is greater or equal to one;
    said eighth number of members must not represent an eleventh number of said second seeds plus a twelfth number of said members wherein said and twelfth number uniquely singles out said eleventh number through a said third operation;
    said sixth number of said RI derivates in said set minus said seventh number of said RI derivates in said first partition equals a thirteenth number of said RI derivates;
    said thirteenth number of RI derivates comprising two subdivisions, a first subdivision of a fourteenth number of said derivates and a second subdivision of a fifteenth number of said derivates, wherein said fourteenth number plus said fifteenth number equals said thirteenth number, wherein said thirteenth number of derivates alter said original representation by being assigned a different said unique sequence of bits that is derived by using said second seeds, wherein said derivates in said second subdivision have said average probability and maintain said number of bits as in said original representation, and said derivates in said first subdivision have said low probability and have assigned a lower number of bits for said unique sequence than in said original representation by employing said second seeds; and
    every time when one of said derivates in said first subdivision occurs in said described IFDS, said compression gain comprising said number of bits of said derivate in said original representation minus said number of bits of said string derivate in said first subdivision;
  when said described IFDS is compressed using said combination of said first techniques, is called that a compression cycle is completed, and said output file becomes a new said IFDS for a repeated said compression cycle; and
  said repeated compression cycle is repeated a variable number of times, wherein said variable number is determined as a function of reaching a desired size for said output file.

18. A procedure to encrypt said output file of claim 17 implemented by a fifth group of digital blocks of specific functionality comprising:
  identifying one or more of said RI derivates as having a role in a said first technique, wherein said role comprising a said seed, a said trigger, a said member, a said class, a said RI derivate with altered original representation
  selecting a pool of equivalent said RI derivates having common one or more of said characteristics to said identified RI derivate, by using said mathematical and relational operations;
  generating an encryption space and an encryption key by a said identified RI derivate through a said mathematical and relational operation applied within said pool;
  said identified RI derivate comprising one of:
  a) said first seed, generating a first encryption space and a corresponding first encryption key;
  b) said second seed, generating a second encryption space and a corresponding second encryption key
    and wherein there is a number of different said second encryption spaces and said second encryption keys equal to the number of distinct said RI derivate classes in which said second seeds are generated, and wherein said "distinct" means that any two said second encryption spaces are generated by two said second seeds of different said characteristics;
  c) said first member generating a third encryption space and a corresponding third encryption key;
    and wherein there is a number of different said third encryption spaces and said third encryption keys equal to the number of distinct said RI derivate classes in which said first seed or said first trigger is replacing a said first member, and wherein said "distinct" means that any two said third encryption spaces are generated by said first members of different said characteristics;
  d) a said RI derivate belonging to said different constructs first partition;
    generating a fourth encryption space fourth encryption space
    and a corresponding fourth encryption key
    and wherein there is a number of different said fourth encryption spaces and said fourth encryption keys equal to the number of distinct said RI derivate classes in which said RI derivate belonging to said first partition belong to, and wherein said "distinct" means that any two said fourth encryption spaces are generated by said RI derivates belonging to said first partition of different said characteristics;
  e) said first trigger, generating a fifth encryption space and a corresponding fifth encryption key;
  generating a total encryption space comprising a combination of one or more of said first encryption space, said second encryption space, said third encryption space, said fourth encryption space, and said fifth encryption space;

generating a global encryption key comprising a combination of one or more of said first encryption key, said second encryption key, said third encryption key, said fourth encryption key, and said fifth encryption key;

wherein said IFDS may be encrypted at the same time with being compressed, or may be only encrypted, wherein said IFDS is only encrypted when said output file represents only said described IFDS with said role of said identified RI derivates still determined.

19. A first procedure to change said content and distribution of claim 6, implemented by a third group of digital blocks of specific functionality, comprising:

modifying a first variable known as variable m, of a first value greater or equal to one, in order to obtain one or more of:
a different number of said PS, a different number of said PS classes, a different number of said PS in each class;
a different number of said RI in said set of primary RI;
a different number of said RI derivates, a different number of said classes, a different of said original representation of said primary RI and of said RI derivates;

choosing for said set of RI derivates from either said set of RI, said set of RI pairs, said set of multiple RI, or said set of RI2, in order to obtain one or more of:
a different number of said RI derivates, a different number of said classes of said RI derivates, a different said original representation of said RI derivates.

20. A second procedure to change said content and distribution of claim 6, implemented by a fourth group of digital blocks of specific functionality, comprising:

partitioning said described IFDS in more than one consecutive slices, wherein each of said slices is characterized by a third size in term of number of bits that is smaller than said first size and is assigned an order number in ascending order representing the order in which a said slice is positioned in said described IFDS;
generating a said output file for each of said slices, called slice output file;
assembling said slice output file of each of said slices according to said order number and such generating a compressed output file for said IFDS.

21. Grouping two or more of said slices of claim 20, wherein
said grouping comprising said compression for said two or more slices to be performed in the same conditions, wherein said same conditions comprising same said seed and same said first technique.

22. Two of said slices of claim 20 are further processed to compress in a said first technique known as cross-class, comprising:
said two slices, a first slice and a second slice, comprising;
within said first slice, a first said seed is singled-out, while none of said first techniques to generate compression gain can be employed;
within said second slice, a said seed cannot be singled-out, while one or more of said first techniques are employed;
said first seed from said first slice is transferred in said second slice, such that in said second slice, both a first said seed can be singled out and at least one of said first techniques is employed, wherein:

when said first seed transferred from said first slice naturally occurs in said second slice, said transferred first seed is differentiated from said naturally occurring first seed, with said differentiated comprising providing a different identity to said transferred first seed and to said naturally occurring first seed; and
a number of bits are written in said output file to specify said two slices and to said differentiate said first seed.

23. The A said first technique of claim 6, called MRI scheme with upper class coverage, comprising:
a first said seed, of a first said number of bits and of a first said unique sequence;
a second number of said RI derivates of a third said number of bits, wherein said third number minus said first number is greater than zero and is equal to a fourth number of bits;
said fourth number of bits concatenated after said first unique sequence create a fifth number of alternate unique sequences;
said fifth number of alternate unique sequences represent an alternate representation for a sixth number of said RI derivates of said third number of bits;
wherein said sixth number is equal to said second number when said fifth number is greater or equal to said second number, or is equal to said fifth number when said fifth number is smaller than said second number; and
when one or more of said sixth number of RI derivates are also represented by said original representation, a said compression gain is achieved every time one of said one or more of said sixth number of RI derivates occurs in said described IFDS.

24. A said first technique of claim 6, known as IFDS transformation, comprising:
failing to obtain a said second size smaller than said first size;
generating said output file as said described IFDS, of said second size equal to said first size; and
initiating a new said compression cycle by said receiving said output file as a new said IFDS.

25. A lossless binary data compression method implemented in hardware or software, comprising hardware blocks or equivalent software modules of specialized functionality, comprising:
describing any arbitrary binary input data string (IFDS) using a set of processing strings (PS), with said IFDS being of a first size in term of number of bits that is greater than a minimum size;
transforming said described IFDS using a set of root identifiers (RI) that relate to said set of PS, wherein each of said binary constructs RI is assigned a unique original representation comprising a probability and a number of bits of a unique sequence, and wherein neither said set of PS nor said set of RI change with said IFDS;
partitioning said transformed IFDS in one or more slices, with each said slice receiving a consecutive order number in accordance to said slice order in said transformed IFDS and having a content and a distribution in term of said RI occurring one or more times in said slice;
independently compressing each of said slices according to schemes comprising mathematical and relational operations between characteristics of said RI that belong or not to said content of said IFDS slice, wherein said mathematical and relational operations comprising comparisons, additions, subtractions, combinations, distributions, permutations, and said characteristics comprising said number of bits, said probability, said unique sequence, said distribution;

assembling each of said compressed IFDS slice based on said consecutive order numbers, and such generating a full compressed IFDS and completing a compression cycle; and executing a number of such compression cycles wherein said full compressed IFDS of current said compression cycle becomes said input IFDS for next said compression cycle, until a compression criteria is achieved.

* * * * *